United States Patent
Keays

(10) Patent No.: US 7,350,044 B2
(45) Date of Patent: Mar. 25, 2008

(54) DATA MOVE METHOD AND APPARATUS

(75) Inventor: Brady L. Keays, Half Moon Bay, CA (US)

(73) Assignee: Micron Technology, Inc., Boise, ID (US)

( * ) Notice: Subject to any disclaimer, the term of this patent is extended or adjusted under 35 U.S.C. 154(b) by 467 days.

(21) Appl. No.: 10/769,016

(22) Filed: Jan. 30, 2004

(65) Prior Publication Data

US 2005/0172065 A1 Aug. 4, 2005

(51) Int. Cl.
*G06F 12/00* (2006.01)
*G11C 7/10* (2006.01)

(52) U.S. Cl. .................. 711/165; 711/170; 711/103; 711/100; 365/189.01; 365/230.04; 365/185.33; 365/185.29

(58) Field of Classification Search ............. 711/165, 711/170, 103, 100; 365/189.01, 230.04, 365/185.33, 185.29
See application file for complete search history.

(56) References Cited

U.S. PATENT DOCUMENTS

| | | | |
|---|---|---|---|
| 4,918,600 A * | 4/1990 | Harper et al. ............. | 711/157 |
| 6,262,918 B1 * | 7/2001 | Estakhri et al. ......... | 365/185.33 |
| 6,422,076 B1 | 7/2002 | Prokofiev | |
| 6,728,161 B1 | 4/2004 | Roohparvar | |
| 7,032,065 B2 * | 4/2006 | Gonzalez et al. ........... | 711/103 |
| 7,117,421 B1 * | 10/2006 | Danilak ..................... | 714/763 |
| 7,155,559 B1 * | 12/2006 | Estakhri et al. ............. | 711/103 |
| 2003/0041210 A1 | 2/2003 | Keays | |
| 2004/0015674 A1 | 1/2004 | Lakhani | |
| 2004/0193774 A1 * | 9/2004 | Iwata et al. .................... | 711/1 |

\* cited by examiner

*Primary Examiner*—Kimberly McLean
(74) *Attorney, Agent, or Firm*—Leffert Jay & Polglaze, P.A.

(57) ABSTRACT

An improved Flash memory device, control circuit, or data handling methods is described that facilitate the moving and consolidating data in split and non-split user/overhead data sector architectures, moving and storing user and overhead data from and to separate non-volatile memory devices, differing erase blocks, or differing sectors of an erase block. This enables ECC checking and masking while moving data. In addition, the use of a split data storage approach is enabled that avoids the issue of potential corruption of both the user data and overhead data due to each being held within close proximity to each other on the same physical row by allowing user/overhead data split across two erase blocks to be easily moved, consolidated, and managed.

102 Claims, 7 Drawing Sheets

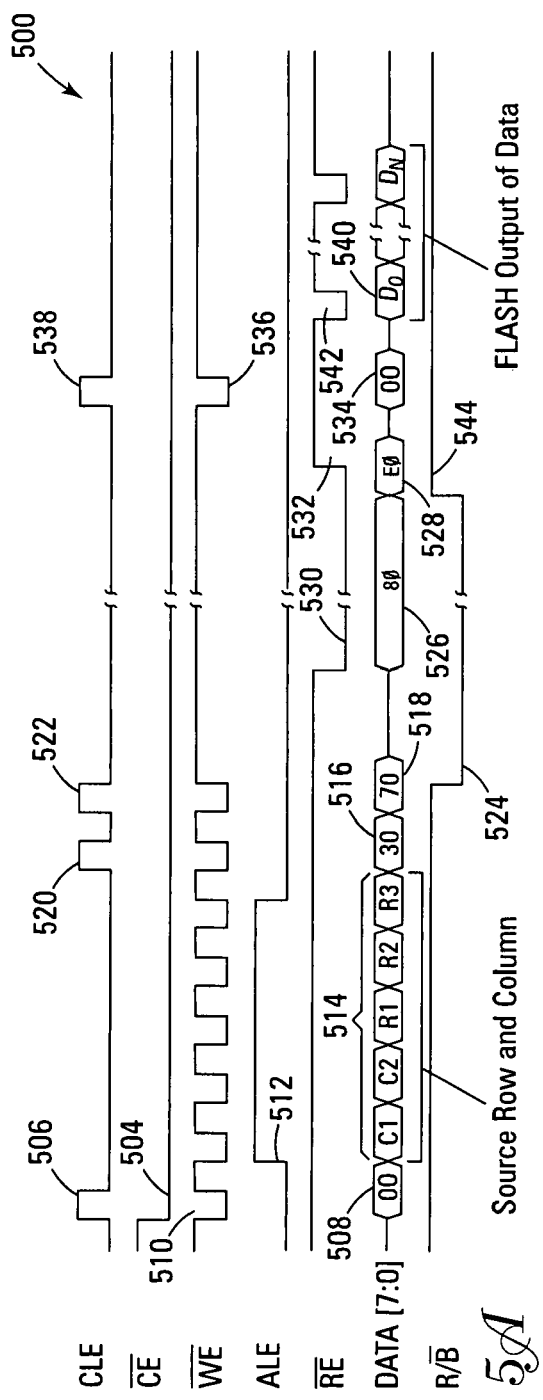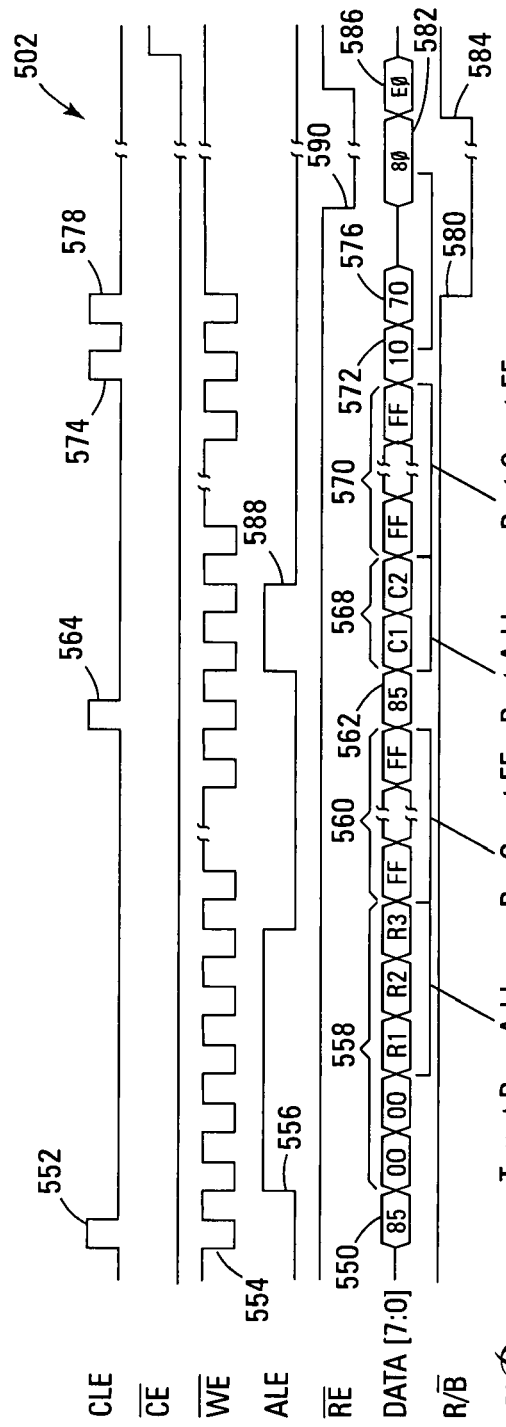

DATA MOVE METHOD AND APPARATUS

TECHNICAL FIELD OF THE INVENTION

The present invention relates generally to integrated circuits and in particular the present invention relates to data management of Flash memory devices.

BACKGROUND OF THE INVENTION

Memory devices are typically provided as internal storage areas in the computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, you can both write data into RAM and read data from RAM. This is in contrast to read-only memory (ROM), which permits you only to read data. Most RAM is volatile, which means that it requires a steady flow of electricity to maintain its contents. As soon as the power is turned off, whatever data was in RAM is lost.

Computers almost always contain a small amount of ROM that holds instructions for starting up the computer. Unlike RAM, ROM cannot be written to. An EEPROM (electrically erasable programmable read-only memory) is a special type non-volatile ROM that can be erased by exposing it to an electrical charge. EEPROM comprise a large number of memory cells having electrically isolated gates (floating gates). Data is stored in the memory cells in the form of charge on the floating gates. Charge is transported to or removed from the floating gates by specialized programming and erase operations, respectively. Other types of non-volatile memory include, but are not limited to, Polymer Memory, Ferroelectric Random Access Memory (FeRAM), Ovionics Unified Memory (OUM), and Magnetoresistive Random Access Memory (MRAM).

Yet another type of non-volatile memory is a Flash memory. A Flash memory is a type of EEPROM that is typically erased and reprogrammed in blocks instead of one byte at a time. A typical Flash memory comprises a memory array, which includes a large number of memory cells. Each of the memory cells includes a floating gate field-effect transistor capable of holding a charge. The data in a cell is determined by the presence or absence of the charge in the floating gate. The cells are usually grouped into sections called "erase blocks." The memory cells of a Flash memory array are typically arranged into a "NOR" architecture (each cell directly coupled to a bitline) or a "NAND" architecture (cells coupled into "strings" of cells, such that each cell is coupled indirectly to a bitline and requires activating the other cells of the string for access). Each of the cells within an erase block can be electrically programmed in a random basis by charging the floating gate. The charge can be removed from the floating gate by a block erase operation, wherein all floating gate memory cells in the erase block are erased in a single operation.

Each erase block of a Flash memory device contains a series of physical pages that are typically each written to a single row of the Flash memory array and include one or more user data areas and an associated control or overhead data areas. The overhead data areas contain overhead information for operation of physical row page and the user data area each overhead data space is associated with. Such overhead information typically includes, but is not limited to, erase block management (EBM) data, sector status information, or an error correction code (ECC). ECC's allow the Flash memory and/or an associated memory controller to detect data errors in the user data area and attempt to recover the user data if possible.

A problem with Flash memories is that each erase block physical row page stores the user data within close proximity to the overhead information, which includes the error correction codes. Because of this, an error in one or more physical row pages of an erase block due to physical damage, impurity migration, write fatigue, electrical transients, etc. can also affect the overhead data associated with those sectors. This increases the likelihood of a loss of data (if the ECC is damaged also) or even the loss of the ability to access the affected physical sector page occurring (if the sector management data is damaged) when such an error happens.

Additionally, many Flash memory devices and memory systems are logically abstracted by a software driver and/or memory controller and presented as a freely rewriteable memory device or as a rewriteable mass storage device, such as a magnetic disk. As a result of this logical abstraction, the user and overhead areas can and are moved about and/or consolidated within the Flash memory device or Flash memory system as data is moved, consolidated, and the underlying erase blocks are scheduled for erasure and reuse. The moving of user and overhead data in erase block architectures is a non-trivial task and is particularly subject to damage or errors in the user data or overhead data areas as this information is generally simply moved and not evaluated for errors in the stored data.

For the reasons stated above, and for other reasons stated below which will become apparent to those skilled in the art upon reading and understanding the present specification, there is a need in the art for circuits or data handing routines that allows for easy moving of data and user/overhead data reliability in erase block based non-volatile memories.

SUMMARY OF THE INVENTION

The above-mentioned problems with data moving and user/overhead data reliability in non-volatile memory systems or devices and other problems are addressed by the present invention and will be understood by reading and studying the following specification.

Non-volatile memory devices, control circuitry, or data handling routines, in accordance with embodiments of the present invention, facilitate the moving and consolidating of user and overhead data, and in particular, fault tolerant split user and overhead data; moving and storing each from and to separate non-volatile memory devices, differing erase blocks, or differing sectors of an erase block. In one embodiment of the present invention, a non-volatile memory utilizes specialized data move hardware and/or routines to read, transfer from the memory, mask off, and store the user data and associated overhead data from a source row or sector to a target row or sector. In another embodiment of the present invention, a non-volatile memory utilizes specialized data move hardware and/or routines to read, mask off, and store the user data in a row or sector of an erase block and the associated overhead data in a row or sector of a different erase block. This enables in embodiments of the present invention to mask the row data as it is moved so as to only move the selected data and/or sectors. In addition, embodiments of the present invention allow the ECC overhead data of a moved sector to be read and evaluated as the underlying user data and overhead data areas are moved without requiring that the data be read out and written back to the non-volatile memory. In split user/overhead data embodiments, a specialized data move hardware helps enable the use of a split data storage approach that avoids the issue of potential corruption of both the user data and overhead data due to each being held within close proximity to each other or on the same physical row (wordline) through facilitating the use of a split data separation of the user data and its associated overhead data by allowing the data to be easily moved, consolidated, and managed, increasing possibility of data recovery in case of a corruption of the user data and/or overhead data stored in either erase block.

For one embodiment, the invention provides a non-volatile memory system comprising at least one non-volatile memory device, wherein the at least one non-volatile memory device contains a memory array with a plurality of physical row pages arranged in a plurality of erase blocks, wherein each physical row page containing one or more user data sectors and one or more overhead data areas, and wherein a non-split data move control circuit is adapted to move one or more selected user data sectors and associated overhead data areas stored in one or more physical row pages of a selected source erase block to a target erase block in a modified copy-back move operation such that selected user data sectors and the associated overhead data areas stored in a source physical row page of the source erase block are moved to a target physical row page of the target erase block by reading the selected user data sectors and the associated overhead data areas into an internal latch of the at least one non-volatile memory device, transferring one or more latched user data sectors and associated overhead data areas from the at least one non-volatile memory device, masking the selected user data sectors and the associated overhead data areas, and writing the selected user data sectors and the associated overhead data areas to the target physical row page.

For another embodiment, the invention provides a non-volatile memory system comprising at least one non-volatile memory device, wherein the at least one non-volatile memory device contains a memory array with a plurality of physical row pages arranged in a plurality of erase blocks, wherein the erase blocks of the at least one non-volatile memory device are arranged in pairs into a plurality of super blocks and each physical row page containing one or more user data sectors and one or more overhead data areas; and wherein a split data move control circuit is adapted to move one or more selected user data sectors stored in two or more physical row pages of a selected source super block to a target super block such that the selected user data sectors stored in a first source physical row page of the source super block are moved to a first target physical row page of the target super block and the associated overhead data areas of the selected user data sectors stored in a second source physical row page of the source super block are moved to a second target physical row page of the target super block.

For yet another embodiment, the invention provides a non-volatile memory controller comprising a control circuit coupled to a host interface, a memory device interface for one or more non-volatile memory devices coupled to the memory control circuit, wherein each of the one or more non-volatile memory devices has a memory array containing a plurality of memory cells arranged into a plurality of sectors in a plurality of erase blocks, and wherein each erase block of the plurality of erase blocks contains a plurality of physical row pages, each physical row page containing one or more user data sectors and one or more overhead data areas, wherein the control circuit is adapted to perform data accesses to the sectors of the plurality of erase blocks of the one or more non-volatile memory devices, and a non-split data move control circuit, wherein the non-split data move control circuit is adapted to move one or more selected user data sectors and associated overhead data areas stored in one or more physical row pages of a selected source erase block of the one or more non-volatile memory devices such that the selected user data sectors and the associated overhead data areas stored in a source physical row page of the source erase block are moved to a target physical row page of a target erase block by reading the selected user data sectors and the associated overhead data areas into an internal latch of the one or more non-volatile memory devices, transferring one or more latched user data sectors and associated overhead data areas from the at least one non-volatile memory device, masking the selected user data sectors and the associated overhead data areas, masking the selected user data sectors and the associated overhead data areas, and writing the selected user data sectors and the associated overhead data areas to the target physical row page.

For a further embodiment, the invention provides a non-volatile memory controller comprising a control circuit coupled to a host interface, a memory device interface for one or more non-volatile memory devices coupled to the memory control circuit, wherein each of the one or more non-volatile memory devices has a memory array containing a plurality of memory cells arranged into a plurality of sectors in a plurality of erase blocks, wherein the erase blocks are arranged in pairs into a plurality of super blocks, and wherein each erase block of the plurality of erase blocks contains a plurality of physical row pages, each physical row page containing one or more user data sectors and one or more overhead data areas, wherein the control circuit is adapted to perform data accesses to the sectors of the erase block pair of a super block of the one or more non-volatile memory devices such that user data access and overhead data accesses are directed to differing erase blocks of the super block, and a split data move control circuit, wherein the split data move control circuit is adapted to move one or more selected user data sectors and associated overhead data areas stored in two or more physical row pages of an erase block pair of a selected source super block of the one or more non-volatile memory devices such that the selected user data sectors stored in a first source physical row page of a first erase block of the source super block are moved to a first target physical row page of a first erase block of a target super block and the associated overhead data areas of the selected user data sectors stored in a second source physical row page of a second erase block of the source super block are moved to a second target physical row page of a second erase block of the target super block.

For yet a further embodiment, the invention provides a method of moving data in a memory system comprising reading one or more user data sectors and one or more overhead data areas of a physical page row of a source erase block from a selected non-volatile memory device of one or more non-volatile memory devices, transferring selected data from the selected non-volatile memory device, masking the one or more user data sectors and one or more overhead data areas, and writing the one or more user data sectors and one or more overhead data areas to a physical page row of a target erase block.

For another embodiment, the invention provides a method of moving split data in a memory system comprising reading one or more user data sectors of a physical page row of a first source erase block of a source super block from a selected non-volatile memory device of one or more non-volatile memory devices, writing the one or more user data sectors to a physical page row of a first target erase block of a target super block, reading one or more overhead data areas of a physical page row of a second source erase block of the source super block, and writing the one or more overhead data areas to a physical page row of a second target erase block of a target super block.

Other embodiments are also described and claimed.

BRIEF DESCRIPTION OF THE DRAWINGS

FIGS. 5A and 5B detail waveforms of a split data move control circuit in accordance with an embodiment of the present invention.

DETAILED DESCRIPTION OF THE INVENTION

Figure 1:
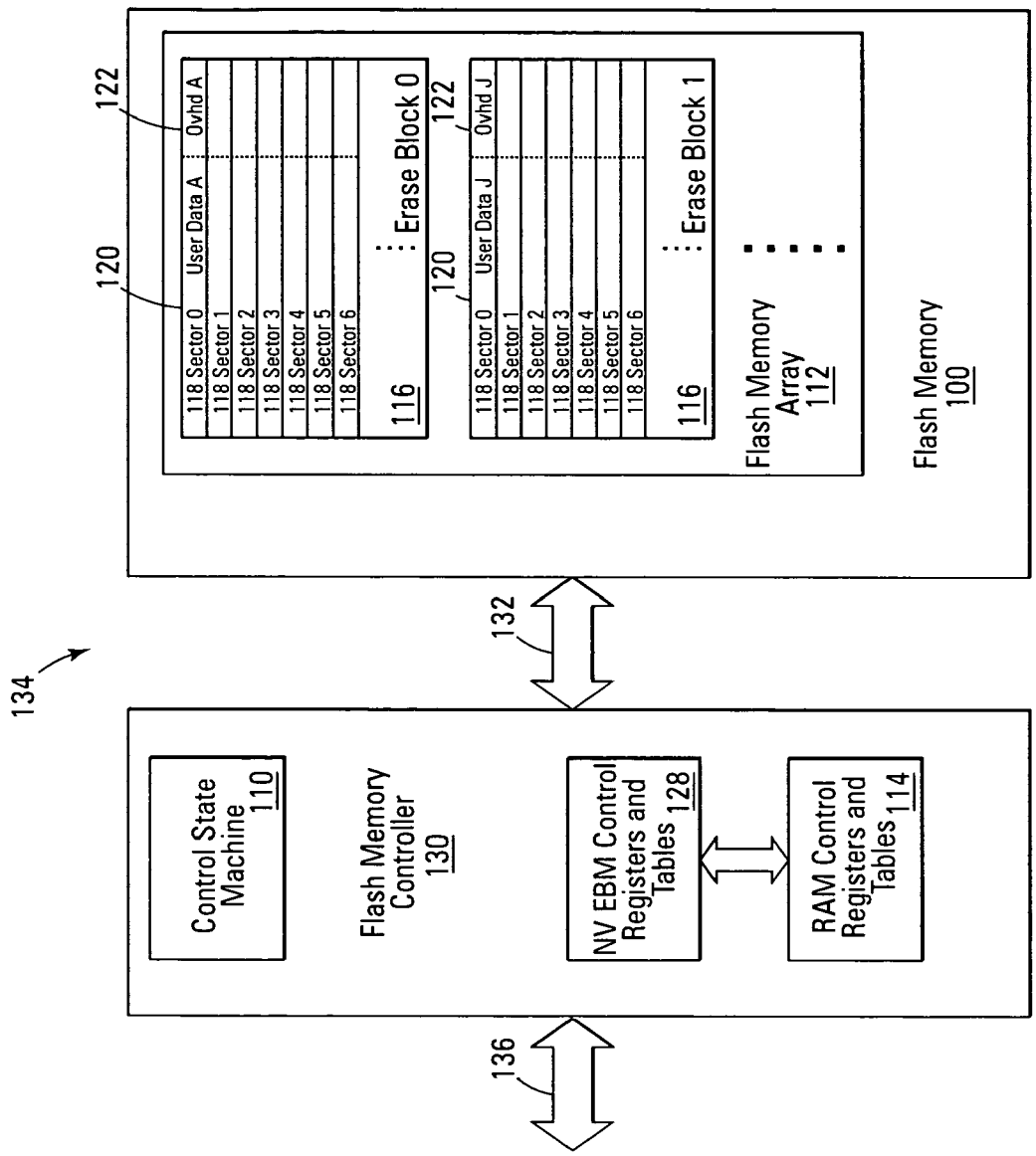
FIG. 1 details a Flash memory in accordance with an embodiment of the present invention.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Non-volatile memory devices, control circuitry, or data handling routines, in accordance with embodiments of the present invention, facilitate the moving and consolidating of data in split and non-split user/overhead data sector architectures, moving and storing user and overhead data from and to separate non-volatile memory devices, differing erase blocks, or differing sectors of an erase block. This enables ECC checking and masking while moving data. In addition, the use of a split data storage approach is enabled that avoids the issue of potential corruption of both the user data and overhead data due to each being held within close proximity to each other or on the same physical row (wordline), allowing the data to be easily moved, consolidated, and managed. In one non-volatile memory embodiment of the present invention, the memory utilizes specialized data move hardware and/or routines to read, transfer from the memory, mask off, and store the user data and associated overhead data from a source erase block to the one or more sectors of a target erase block. In another non-volatile memory embodiment of the present invention, the memory utilizes specialized data move hardware and/or routines to read, mask off, and store the user data in a sector of an erase block and the associated overhead data in a sector of a different erase block. This data move circuitry and method facilitates the use of split data separation of the user data and its associated overhead data, allowing for an increased possibility of data recovery in case of a corruption of the user data and/or overhead data stored in either erase block. In one embodiment of the present invention, ECC overhead data of a moved sector is evaluated as the underlying split or non-split user data and overhead data areas are moved. This allows data errors in the user data or overhead data/ECC to be noted and/or fixed.

As stated above, the two common types of Flash memory array architectures are the "NAND" and "NOR" architectures, so called for the similarity each basic memory cell configuration has to the corresponding logic gate design. In the NOR array architecture, the floating gate memory cells of the memory array are arranged in a matrix similar to RAM or ROM. The gates of each floating gate memory cell of the array matrix are coupled by rows to word select lines (word lines) and their drains are coupled to column bit lines. The source of each floating gate memory cell is typically coupled to a common source line. The NOR architecture floating gate memory array is accessed by a row decoder activating a row of floating gate memory cells by selecting the word line coupled to their gates. The row of selected memory cells then place their stored data values on the column bit lines by flowing a differing current if in a programmed state or not programmed state from the coupled source line to the coupled column bit lines. A column page of bit lines is selected and sensed, and individual data words are selected from the sensed data words from the column page and communicated from the Flash memory.

A NAND array architecture also arranges its array of floating gate memory cells in a matrix such that the gates of each floating gate memory cell of the array are coupled by rows to word lines. However each memory cell is not directly coupled to a source line and a column bit line. Instead, the memory cells of the array are arranged together in strings, typically of 8, 16, or more each, where the memory cells in the string are coupled together in series, source to drain, between a common source line and a column bit line. This allows a NAND Flash array architecture to have a higher memory cell density than a comparable NOR Flash array, but with the cost of a generally slower access rate and programming complexity.

A NAND architecture floating gate memory array is accessed by a row decoder activating a row of floating gate memory cells by selecting the word select line coupled to their gates. In addition, the word lines coupled to the gates of the unselected memory cells of each string are also driven. However, the unselected memory cells of each string are typically driven by a higher gate voltage so as to operate them as pass transistors and allowing them to pass current in a manner that is unrestricted by their stored data values. Current then flows from the source line to the column bit line through each floating gate memory cell of the series coupled string, restricted only by the memory cells of each string that are selected to be read. This places the current encoded stored data values of the row of selected memory cells on the column bit lines. A column page of bit lines is selected and sensed, and then individual data words are selected from the sensed data words from the column page and communicated from the Flash memory.

Because all the cells in an erase block of a Flash memory device are generally erased all at once, one cannot directly rewrite a Flash memory cell without first engaging in a block erase operation. EBM, typically under the control of an internal state machine, an external Flash memory controller, or software driver, provides an abstraction layer for this to the host (a processor or an external memory controller), allowing the Flash device to appear as a freely rewriteable device, including, but not limited to, managing the logical address to physical erase block translation mapping for reads and writes, the assignment of erased and available erase blocks for utilization, and the scheduling erase blocks that have been used and closed out for block erasure. Erase block management also allows for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erase block and Flash memory device as a whole.

In many modern Flash memory device implementations, the host interface and erase block management routines additionally allow the Flash memory device to appear as a read/write mass storage device (i.e., a magnetic disk) to the host. One such approach is to conform the interface to the Flash memory to be identical to a standard interface for a conventional magnetic hard disk drive allowing the Flash memory device to appear as a block read/write mass storage device or disk. This approach has been codified by the Personal Computer Memory Card International Association (PCMCIA), Compact Flash (CF), and Multimedia Card (MMC) standardization committees, which have each promulgated a standard for supporting Flash memory systems or Flash memory "cards" with a hard disk drive protocol. A Flash memory device or Flash memory card (including one or more Flash memory array chips) whose interface meets these standards can be plugged into a host system having a standard DOS or compatible operating system with a Personal Computer Memory Card International Association-Advanced Technology Attachment (PCMCIA-ATA) or standard ATA interface. Other additional Flash memory based mass storage devices of differing low level formats and interfaces also exist, such as Universal Serial Bus (USB) Flash drives.

A problem with presenting the host interface as a read/write device is that the erase blocks of the underlying Flash memory device (and many other non-volatile memory devices) are not generally read/writeable and require a block erase and reprogramming to be able to change the data held in a given erase block. Thus automated data move processes have been developed (for example, the "copy-back" operation) to allow data to be easily moved internal to the Flash memory device and enable block erasure and the memory system to appear externally as a read/write device. A copy-back operation occurs wholly within a Flash memory device does not generally read the moved data out of the memory device. As a result, it is fast, but does not allow for the moved data to be ECC checked for errors or masked so that only the desired data is moved. In prior art Flash memory devices and systems, the data must be read out of the Flash memory device to allow it to be ECC checked and/or masked and then written back into the device. This external communication makes this a much slower process.

Many of the modern computer operating systems, such as "DOS" (Disk Operating System), were developed to support the physical characteristics of hard drive structures; supporting file structures based on heads, cylinders and sectors. The DOS software stores and retrieves data based on these physical attributes. Magnetic hard disk drives operate by storing polarities on magnetic material. This material is able to be rewritten quickly and as often as desired. These characteristics have allowed DOS to develop a file structure that stores files at a given location which is updated by a rewrite of that location as information is changed. Essentially all locations in DOS are viewed as fixed and do not change over the life of the disk drive being used therewith, and are easily updated by rewrites of the smallest supported block of this structure. A sector (of a magnetic disk drive) is the smallest unit of storage that the DOS operating system supports. In particular, a sector has come to mean 512 bytes of information for DOS and most other operating systems in existence. Flash memory systems that emulate the storage characteristics of hard disk drives are preferably structured to support storage in 512 byte blocks along with additional storage for overhead associated with mass storage, such as ECC bits, status flags for the sector or erase block, and/or redundant bits.

FIG. 1 shows a simplified diagram of a non-volatile memory subsystem 134 of an embodiment of the present invention that is implemented with Flash memory. In the Flash memory subsystem 134, a Flash memory controller 130 is coupled 132 to one or more Flash memory devices 100. The Flash memory controller 130 typically interfaces 136 to an external host (not shown) to provide access to the Flash memory subsystem 134 and contains a control state machine or embedded processor 110 that directs the operation of the Flash memory device(s) 100; managing the Flash memory array 112 and updating controller internal RAM control registers and tables 114 and the non-volatile erase block management registers and tables 128. The Flash memory array 112 of each Flash memory device 100 contains a sequence of erase blocks 116. Each erase block 116 contains a series of physical row pages or physical sectors 118 that are typically each written to a single row of the memory array 112 and include a one or more user data spaces or areas 120 and an associated control or overhead data spaces or areas 122. The control/overhead data space(s) 122 contain overhead information for operation of the sector control/overhead data space(s) 122 is associated with. Such overhead information typically includes, but is not limited to, erase block management (EBM) data, sector status information, or an ECC (not shown). ECC's allow the Flash memory 100 and/or the Flash memory controller 130 to detect data errors in the user data space 120 and attempt to recover the user data if possible.

The user data space 120 in each physical row page 118 is typically one or more multiples of 512 bytes long (depending on memory array 112 row size), wherein one or more logical operating system (OS) sectors of 512 bytes each or multiple logically addressed data words can be stored on the row or physical row page 118 of the array 112. Each new sector of 512 bytes of user data and its associated overhead data are together written into an available erase block physical row page 118 (i.e., User data A with Overhead data A within a single erase block physical row 118) as the user data arrives at the Flash memory 100. User data is typically written sequentially into the sectors of the physical row pages 118 of an erase block 116 until the erase block 116 is filled. It is noted that other configurations of Flash memory subsystems 134, having Flash memory devices 100 and Flash memory controllers 130, are well known in the art, including such devices that integrate the functions of the separate Flash memory controller and Flash memory device into a single device. It is also noted that the data move operations of Flash memory embodiments of the present invention can apply to other non-volatile memory types including, but not limited to, polymer memory, FeRAM, OUM, and MRAM and should be apparent to those skilled in the art with the benefit of the present invention.

Non-volatile memory devices that split their user data and overhead data and therefore are not as vulnerable to data corruption that occurs within a physical row page are detailed in U.S. patent application Ser. No. 10/602,991, titled "Erase Block Data Splitting", filed Jun. 24, 2003, which is commonly assigned.

Figure 2A:
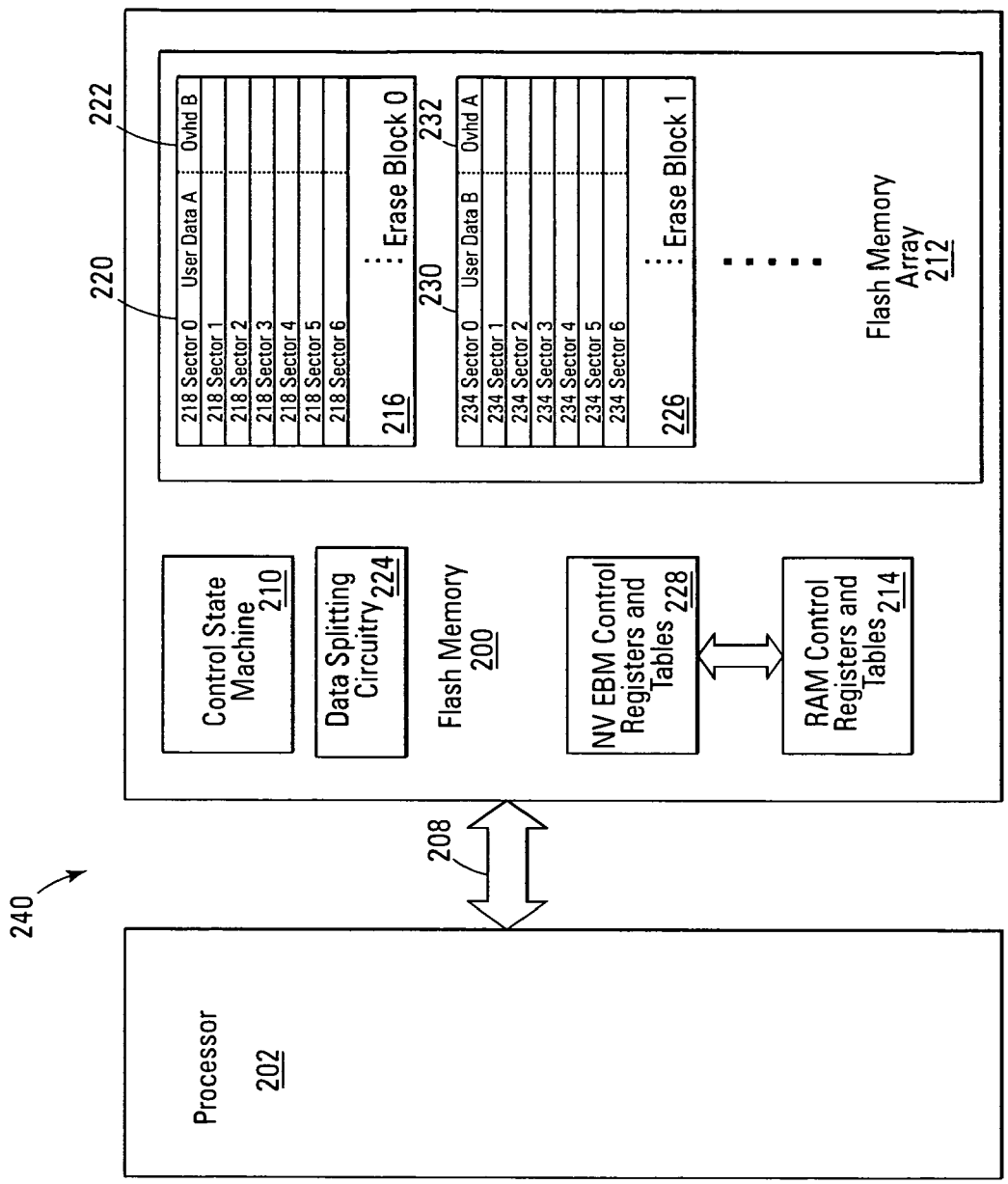
FIGS. 2A and 2B detail memory systems with Flash memory in accordance with embodiments of the present invention.

FIG. 2A is a simplified diagram of a system 240 that incorporates a split data Flash memory device 200 embodiment of the present invention. In the system 240 of FIG. 2A, the Flash memory 200 is coupled to a processor 202 with an address/data bus 208. Internally to the Flash memory device, a control state machine 210 directs internal operation of the Flash memory device; managing the Flash memory array 212 and updating RAM control registers and tables 214. The Flash memory array 212 contains a sequence of erase blocks 216, 226 arranged in paired sets of erase blocks. Each erase block 216, 226 contains a series of physical pages, each page containing one or more logical sectors 218, 234 (shown here for illustration purposes as a single logical sector 218, 234 per physical page/row) that contain a user data space 220, 230 and a control/overhead data space 222, 232. The overhead data space 222, 232 contains overhead information for operation of the sector 218, 234, such as an error correction code (not shown), status flags, or an erase block management data field area (not shown). The RAM control registers and tables 214 are loaded at power up from the non-volatile erase block management registers and tables 228 by the control state machine 210. The user data space 220 in each logical sector 218 is typically 512 bytes long. It is noted that other interfaces to the Flash memory 200 and formats for the erase blocks 216, 226, physical pages, and sectors 218, 234 are possible and should be apparent to those skilled in the art with benefit of the present disclosure.

In FIG. 2A, when user data is written to a sector 218, 234 of an erase block 216, 226 of the Flash memory 200, the overhead data generated for the user data is written into the overhead data area 222, 232 of a sector 218, 234 of the associated erase block 216, 226 of the erase block super block pair. For example, User Data A written to the user data area 220 of Sector 0 218 of Erase Block 0 216 will have its Overhead Data (Ovhd A) written to the overhead data area 232 of Sector 0 234 of Erase Block 1 226; User Data B written to the user data area 230 of Sector 0 228 of Erase Block 1 226 will have its Overhead Data (Ovhd B) written to the overhead data area 222 of Sector 0 218 of Erase Block 0 216.

When user data is read from a sector of an erase block of the Flash memory 200, the overhead data for the user data is read from the overhead data area of a sector of the associated erase block of the erase block super block pair. For example, User Data A read from the user data area 220 of Sector 0 218 of Erase Block 0 216 will have its Overhead Data (Ovhd A) read from the overhead data area 232 of Sector 0 234 of Erase Block 1 226; User Data B read from the user data area 230 of Sector 0 234 of Erase Block 1 226 will have its Overhead Data (Ovhd B) read from the overhead data area 222 of Sector 0 218 of Erase Block 0 216.

Dedicated data splitting circuitry 224 is utilized in the Flash memory 200 embodiment of the present invention to automate the split of the user data and overhead data and to improve the operation of writing, reading, or moving the split user/overhead data from each erase block super block pair of the Flash memory array 212. This dedicated data splitting hardware 224 eliminates the need for these operations to be handled by the control state machine/firmware 210 and thus reduces the access time penalty of splitting the user data and overhead data. The erase blocks 216, 226 of the Flash memory 200 are erased and allocated in pairs by the control state machine/firmware 210. Erase block erasure of Flash memory 200 embodiments of the present invention also are generally done under control of the control state machine/firmware 210, as the operation is infrequent and of a relatively long duration, reducing its time criticality.

Figure 2B:
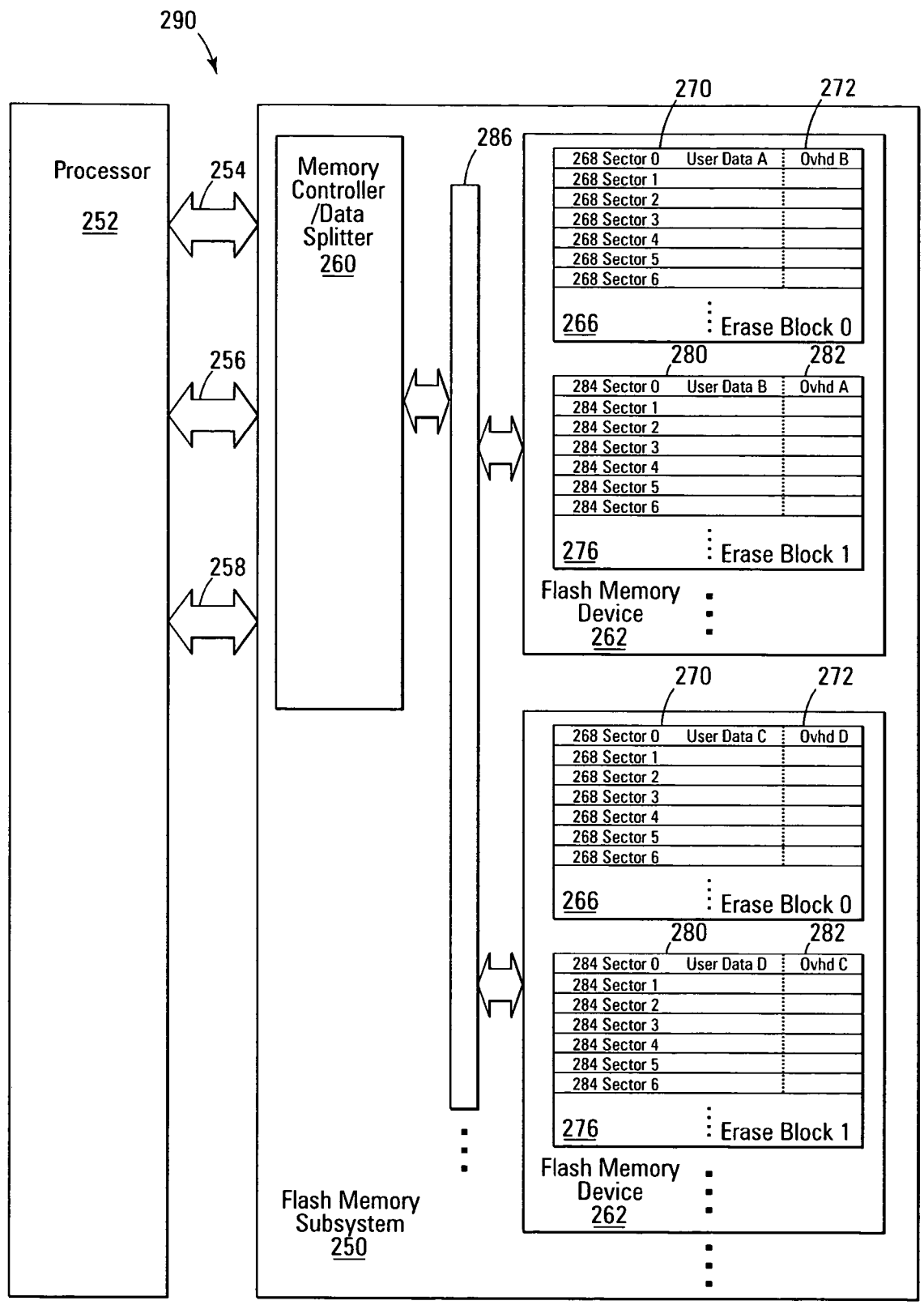

FIG. 2B is a simplified diagram of another system 290 that incorporates a split data Flash memory system 250 embodiment of the present invention. In the system 290 of FIG. 2B, the Flash memory system 250, such as a memory system or Flash memory card, is coupled to a processor 252 with an address 254, control 256, and data bus 258. Internal to the Flash memory system 250, a memory controller 260 directs internal operation of the Flash memory system 250; managing the Flash memory devices 262, directing data accesses, updating internal control registers and tables (not shown), and/or directing operation of other possible hardware systems (not shown) of the Flash memory system 250. The memory controller 260 incorporates an internal hardware data splitter (not shown) and may also incorporate a small local embedded processor to help manage the Flash memory system 250. The memory controller 260 is coupled to and controls one or more Flash memory devices 262 via an internal control bus 286. It is noted that other architectures Flash memory systems 250, external interfaces 254, 256, 258, and manners of coupling the memory controller 260 to the Flash memory devices 262, such as directly coupled individual control busses and signal lines, are possible and should be apparent to those skilled in the art with benefit of the present disclosure.

The Flash memory devices 262 each contain a sequence of erase blocks 266, 276 in their internal memory arrays. Each erase block 266, 276 contains a series of physical pages, each physical page having one or more logical sectors 268, 284 that contain a user data space 270, 280 and a control/overhead data space 272, 282 (shown here for illustration purposes as a single logical sector 268, 284 per physical page/row). The overhead data space 272, 282 contains overhead information for operation of the logical sector 268, 284, such as an ECC code (not shown), status flags, or an erase block management data field area (not shown). In a Flash memory system 250 embodiment of the present invention each Flash memory device 262 has their erase blocks 266, 276 internally arranged in paired sets of erase blocks (super blocks). In another Flash memory system 250 embodiment of the present invention paired sets of erase blocks 266, 276 (super blocks) are arranged across two or more Flash memory devices 262. It is noted that other formats and pairings for Flash memory devices 262, erase blocks 266, and sectors 268 are possible and should be apparent to those skilled in the art with benefit of the present disclosure.

Figure 3A:
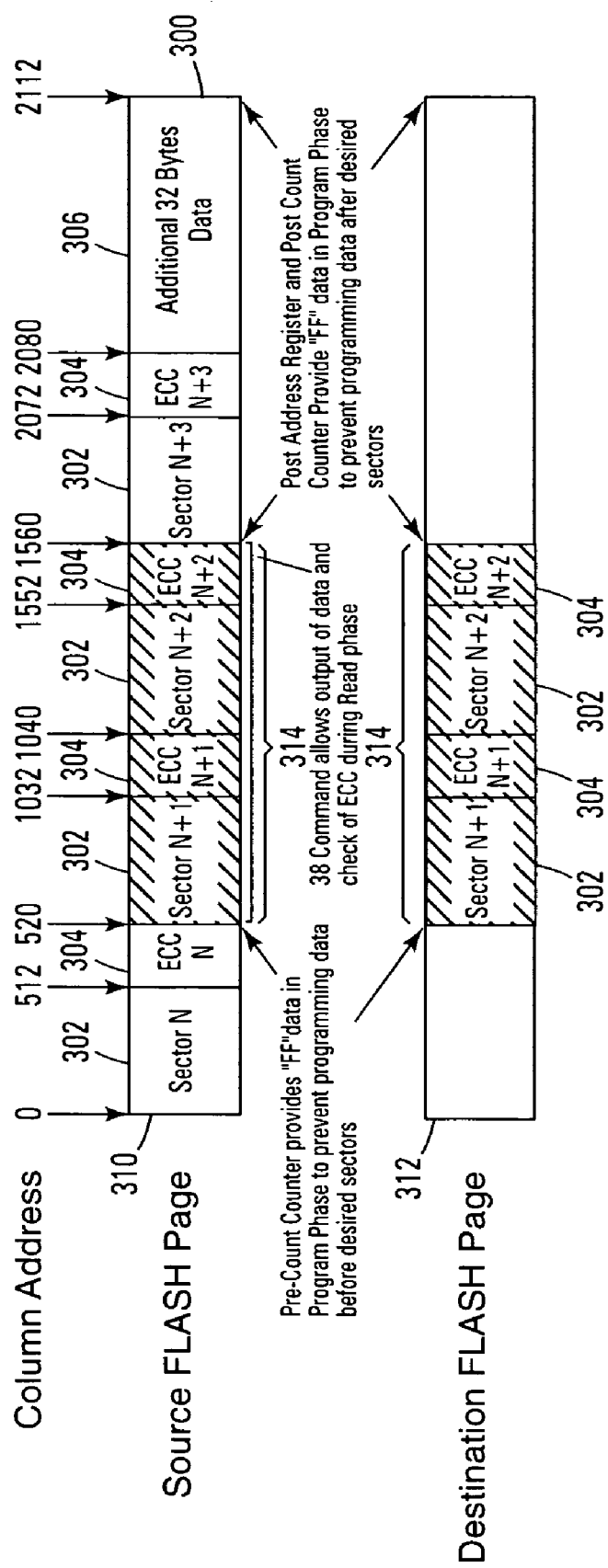
FIG. 3A details a NAND Flash erase block sector and data move operation of an embodiment of the present invention.

As stated above, many non-volatile memories support multiple logical sectors or data words within a single physical column page/row sector (also known as the physical sector). In particular, NAND architecture Flash memories typically utilize this approach due to their generally higher memory cell density and larger column page sizes. FIG. 3A details an example of a NAND architecture Flash memory physical row page 300 of a Flash memory device array of an embodiment of the present invention. The physical page 300 of FIG. 3A contains 2112 bytes of data and is formatted to contain four 512-byte logical sectors 302. In addition, space is provided following each 512-byte logical sector 302 for the associated overhead data 304 of an ECC code of 8 bytes each. A further 32 bytes 306 is reserved for use by the EBM firmware or other system level usage. The four 512-byte logical sectors 302 are sequentially addressed N, N+1, N+2, and N+3, where N is a base logical sector address for the physical page 300. The overhead data areas/ECC codes 304 of the physical page 300 are also sequentially addressed N, N+1, N+2, and N+3 to correspond with their associated logical sector 302 of the physical page 300. Each overhead/ECC code area 304 follows the logical sector 302 it is associated with within the physical page 300 (sector N, ECC N, sector N+1, ECC N+1, etc). It is noted that the physical page 300 is for illustration purposes and that other physical column page sector formats of differing data sizes, numbers of logical sectors/data words, relative positioning of sector and ECC data within a physical page, and data write/read access methods/patterns are possible.

In a NAND architecture Flash memory, a prior art data move operation moves the selected logical data sector(s) and overhead/ECC data areas 314 from the source physical row page 310 to the target physical row page 312 utilizing a NAND "copy-back" command (a 00/35 command sequence). After the copy-back command is issued, the source physical row page 310 containing the data to be moved 314 is read from the memory array into the internal data latches of the Flash memory device (not shown). The selected logical data sectors 314 are then optionally masked and written to the target physical page 312. It is noted that because the selected logical data sectors and their associated overhead data areas 314 in a conventional non-split data NAND architecture Flash memory are in a contiguous section of the source physical page 310, this can be accomplished without much difficulty. A single range of data words or column bits to be moved is selected from the source physical page 310 and moved to the target physical page 312 during the copy-back operation. It is also noted that in a standard copy-back operation the data typically stays internal to the memory device and is not read out. Because of this, and the general overhead involved, the ECC codes are not evaluated. Thus, any memory device read errors or data corruption errors in the moved data, in either the user data of the moved sector or ECC data 314, will not be detected and/or corrected. Any such errors are generally copied into the target physical page verbatim, propagating the error forward and possibly contributing to deterioration of the data held in the memory device.

In a NAND architecture Flash memory embodiment of the present invention, a data move operation moves the selected logical data sector(s) and overhead/ECC data areas 314 from the source row page 310 to the target row page 312 utilizing a modified copy-back operation. The modified copy-back operation utilizes a sequence of NAND commands that read the source physical pages into internal data latches of the memory device, read the source physical pages out of the memory device, mask off the data in the latches that is not to be moved, and write the modified latch data to a target physical page.

In moving, the source physical row page 310, containing the data sectors 302 and overhead/ECC data areas 304 to be moved 314, is read from the source erase block of the Flash memory device into the internal data latches (not shown). Selected data sectors 302 and overhead/ECC data areas 304 are read from the memory device from the internal latches. Typically the selected data sectors 302 and overhead/ECC data areas 304 are read from the memory device to be externally checked for ECC errors. Any sector data 302 and overhead/ECC data areas of the source physical row page 310 that are not to be moved to the target physical row page 312 of the target erase block (which may be the same erase block as the source erase block) is masked off. This is typically done in Flash memory by writing "FF" data (logical 1's) to the portion of the internal data latches that contain the undesired data sectors (Flash memory floating gate cells are in an erased state at logical "1" and program to logical 2"0", thus writing a logical "1" to a Flash memory cell maintains its current state). The modified contents of the internal data latches containing the logical data sectors 302 and overhead/ECC data areas 304 to be moved 314 are then written to the target physical row page 312.

Figure 3B:
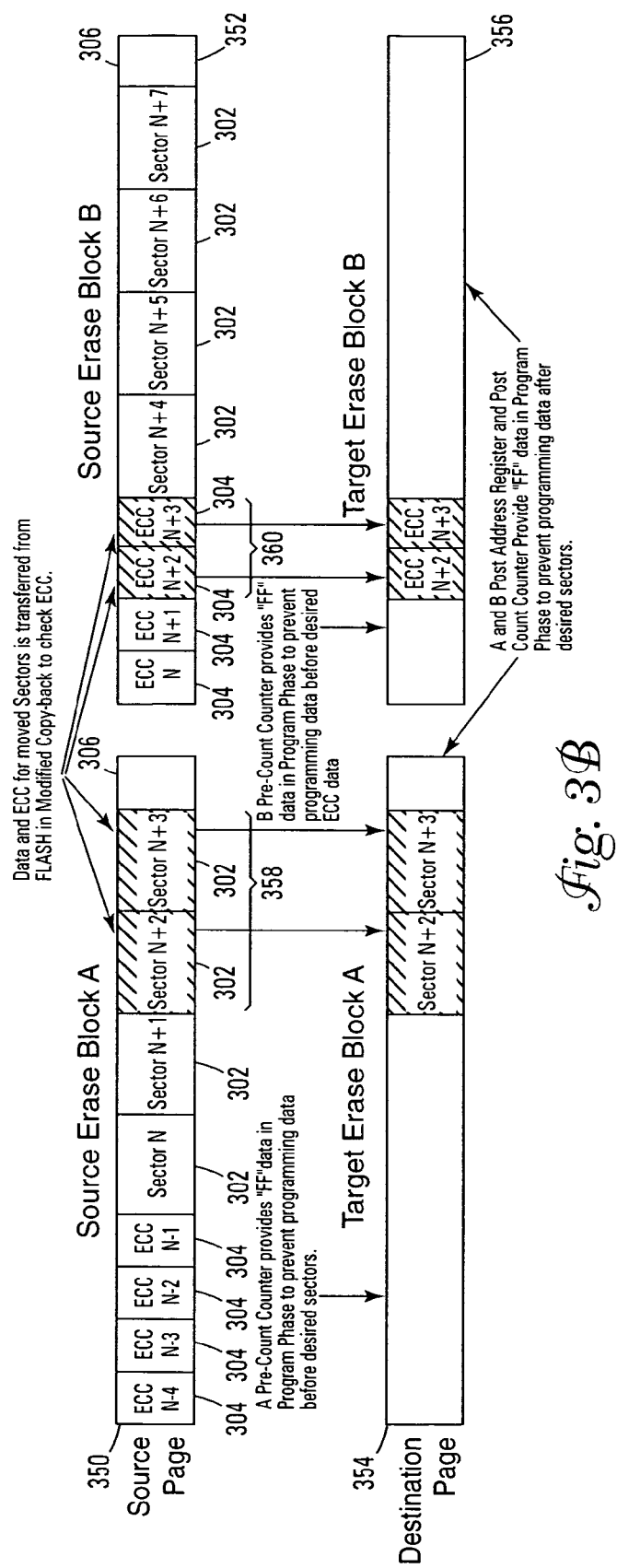
FIG. 3B details two paired data split NAND Flash erase block sectors and data move operation of an embodiment of the present invention.

FIG. 3B details a split data move operation with a corresponding sequential pair of data split Flash memory physical row pages 350, 352 of a NAND architecture Flash memory device array of an embodiment of the present invention. During the move a selected set of logical sectors 358 and associated overhead data/ECC areas 360 are moved from the source pair of data split Flash memory physical row pages 350, 352 to a target sequential pair of data split Flash memory physical row pages 354, 356. Each physical page of pair of physical pages (source pair 350, 352 and target pair 354, 356) are paired across two erase blocks for fault tolerance purposes (Erase Block A and Erase Block B). The physical pages 350, 352, 354, 356 of FIG. 3B each contain 2112 bytes of data and are formatted to contain four 512-byte logical sectors 302. In addition, space is provided at the beginning of the physical pages 350, 352 for four overhead data areas/ECC codes 304 of 8 bytes each. A further 32 bytes 306 is reserved for use by the EBM firmware or other system level usage.

The four 512-byte logical sectors 302 of each first physical page 350, 354 of each pair are sequentially addressed N, N+1, N+2, and N+3, where N is a base logical sector address for the first physical page 350, 354 of each pair. The four 512-byte logical sectors 302 of each second physical page 352, 356 of each pair are contiguously addressed from the first physical page 350, 354 and continue N+4, N+5, N+6, and N+7 respectively, where N is the base logical sector address for the first physical page 350, 354 of each pair. The ECC codes 304 of the physical page 350, 354 of each physical page pair are sequentially addressed N−4, N−3, N−2, and N−1 to allow them to store the ECC codes for the four sectors of the previously addressed physical page (not shown). The ECC codes 304 of the second physical page 352, 356 of each physical page pair are sequentially addressed N, N+1, N+2, and N+3 to allow them to store the ECC codes associated with the four sectors of first physical page 350, 354 of each pair (their previously addressed physical page). Following this pattern, the ECC codes associated with the four sectors (N+4, N+5, N+6, and N+7) of second physical page 352, 356 of each pair are stored in the next following addressed physical page (not shown).

It is noted that the split and non-split data formats of the source 310, 350, 352 and target 312, 354, 356 of physical pages are for illustrative purposes and that other physical column page sector formats of differing data sizes, numbers of logical sectors/data words, and split data write/read access methods/patterns for embodiments of the present invention are possible and should be apparent to those skilled in the art with the benefit of the present disclosure.

As stated above, in split and non-split data move operations of NAND architecture Flash memory of embodiments of the present invention, the selected logical data sector(s) and overhead/ECC data areas 314 are moved in a modified copy-back operation utilizing a sequence of NAND commands that read the source physical pages into internal data latches of the memory device, optionally transfer selected data bytes/sectors from the internal data latches external to the memory device, mask off the data in the latches that is not to be moved, and write the modified latch data to a target physical page. It is noted that in split data embodiments because of the data splitting of user/sector data 302 and overhead data/ECC codes 304 across two paired source erase blocks 350, 352 in embodiments of the present invention, data moves of one or more selected data sectors 302 and the associated ECC codes 304 becomes a non-trivial multiple erase block operation with at least two non-contiguous sections of data words/column bits of data sectors 358 and ECC codes 360 in differing erase blocks to be moved in a manner not generally supported by a standard copy-back operation.

In a split data move, the source physical row page 350, containing the data sectors 302 to be moved 358, is read from its erase block (erase block A) of the Flash memory device into the internal data latches (not shown). Any sector data 302 of the source physical row page 350 that is not to be moved to the target physical row page 354 of the target erase block A is masked off. This is typically done in Flash memory by writing "FF" data (logical 1's) to the portion of the internal data latches that contain the undesired data sectors (Flash memory floating gate cells are in an erased state at logical "1" and program to logical "0", thus writing a logical "1" to a Flash memory cell maintains its current state). The modified contents of the internal data latches containing the logical data sectors 302 to be moved 358 are then written to the target physical row page 354. The ECC codes 360 for the selected data sectors 358 are then read from the source physical page 352 they are stored in (from erase block B of the Flash memory device) to the internal data latches. Any ECC data 304 of the source physical row page 352 that is not to be moved to the target physical row page 356 of the target erase block B is masked off. The modified contents of the internal data latches containing the ECC codes to be moved 360 are then written to the target physical row page 356 of target erase block B.

In one non-split data embodiment of the present invention, the selected sector and ECC data 314, once it is read from the source physical page 310, is transferred from the NAND architecture Flash memory in a serialized manner. An ECC code is then generated for each sector 302 being moved 314. These newly generated ECC codes are then evaluated against the stored ECC codes 304 being moved from the source erase block 310. This allows for detection and, in some cases, correction of errors in the read sector or stored ECC. The ECC code generation and evaluation is typically done outside of the memory device by external hardware, this also allows the sector data of the physical page to be serialized for ease of ECC code generation.

In an ECC evaluating split data embodiment of the present invention, the selected sector data 358, once it is read from the source physical page 350, is also transferred from the NAND architecture Flash memory in a serialized manner. An ECC code is then generated for each sector 302 being moved 358 and stored. These newly generated ECC codes are then evaluated against the ECC codes 304 stored in the paired physical page 352 of source erase block B when the associated ECC codes 360 are read and moved, allowing for detection and, in some cases, correction of errors in the read sector or stored ECC.

If an ECC failure occurs and an error is detected in either the data sector 302 or the stored ECC code 304, there are multiple possible manners in which the error can be handled in the split or non-split data move operations, depending on whether the error is fixable or unfixable. This is further complicated by the fact that, in some memories with split sector data and ECC code, the sector data being moved 358 may already have been written to a target physical page by the time its associated ECC data 360 is read from the second source physical page 352 and evaluated against the ECC data generated from the sector data 358.

If the error is of an unfixable type (a data failure), the data move operation may simply ignore the error as it is unfixable. In this situation the data is left until it is accessed by a higher level function or an operating system that can deal with it. The data move operation can also mark the sectors as being corrupted in the memory device or memory system to attempt later recovery or to be dealt with later by another process, such as a file system process or an operating system. Alternatively, the data move operation can alert the higher level process upon occurrence of the unfixable error/data failure to allow it to be immediately dealt with.

If the error is of a fixable type (a correctable data error), the data move operation may again simply ignore the error. In particular, the error may be ignored in a split data move operation because, as stated above, with the split sector data/ECC, the sector data being moved 358 has already been written to a target physical page by the time its associated ECC data 360 is read from the second source physical page 352 and evaluated against the ECC data generated from the sector data 358, rendering it uncorrectable unless the sector data 358 is rewritten or moved again. In a non-split data move operation the sector data 302 may still be held in the internal data latches and not been written yet to the target erase block 312, therefore it may be corrected before being written. However, in either the split or non-split data move operation, if the data is correctable and is not corrected as it is moved, the stored ECC codes will allow it to be corrected later before it is utilized. Alternatively, in either a split or non-split data move operation the error can be corrected by re-reading the source data 314, 358, 360, correcting the error, selecting new destination/target physical sector(s) 312, 354, 356, and re-programming the corrected data 314, 358, 360.

In another alternative split data embodiment of the present invention, a modified memory device containing two data latches to allow the reading and correction of both the sector data 358 and associated ECC data 360 being moved before programming them to their target physical pages 354, 356. These latches can be internal to the memory device for fast block to block transfer or external to memory device in the memory controller and thus advantageous to memory device to memory device transfers.

It is noted that the data move operation of NAND architecture Flash memory embodiments of the present invention can apply to other non-volatile memory types including, but not limited to, polymer memory, FeRAM, OUM, and MRAM and should be apparent to those skilled in the art with the benefit of the present invention.

Figure 4:
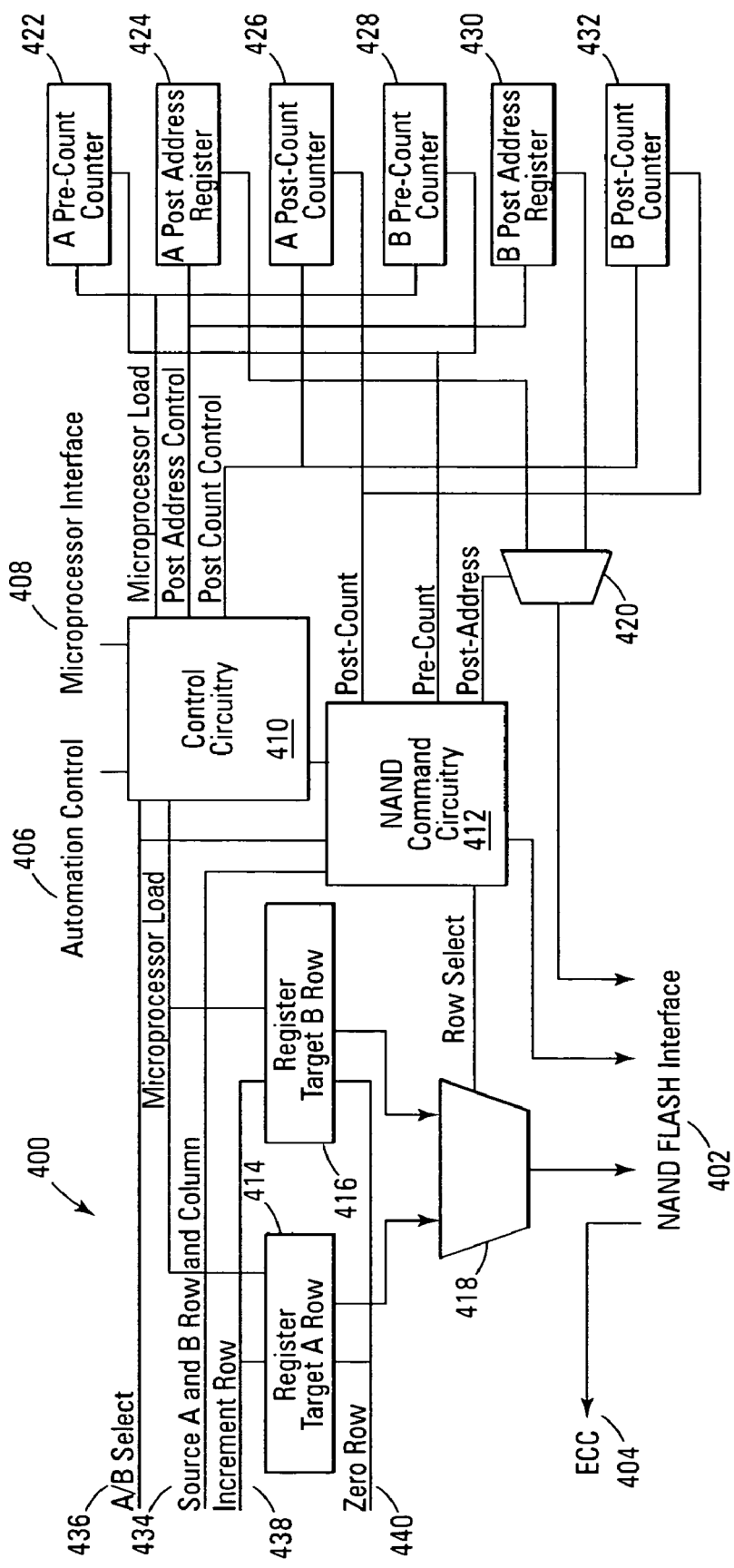
FIG. 4 details a split data move control circuit in accordance with an embodiment of the present invention.

FIG. 4, details a simplified diagram of a split data move control circuit 400 of a memory system or memory controller embodiment of the present invention. The split data move control circuit 400 operates with the data splitting hardware (such as is disclosed in U.S. patent application Ser. No. 10/602,991, titled "Erase Block Data Splitting", filed Jun. 24, 2003), and which issued on Jun. 14, 2005 as U.S. Pat. No. 6,906,961) and allows for automating of a split data move operation with automatic generation of sequential target addresses and masking of data given a starting address loaded into it by a processor or a memory controller. This simplifies the memory system address control in a move operation in a data splitting memory or memory system. It is noted that a non-split data move control circuit based off the split data move control circuit 400 of FIG. 4 for embodiments of the present invention is possible and should be apparent to those skilled in the art with the benefit of the present disclosure.

In the split data move control circuit 400 of FIG. 4, a control circuit 410 controls operation of the split data move control circuit 400 and is coupled to a microprocessor (not shown) and an automation control (not shown) through a microprocessor interface 408 and an automation control interface 406, respectively. The microprocessor may be an external processor or an internal microcontroller of a memory controller and directs operation of the memory system or memory controller that the split data move control circuit 400 is a part of. The automation control provides for logical abstraction and management of the erase blocks, automating mapping of logical addresses provided by the microprocessor or external system to physical addresses in the erase blocks of one or more NAND architecture Flash memory devices coupled to the split data move control circuit 400 via the NAND Flash interface 402. The control circuit 410 is also coupled to and directs a NAND Command circuit 412. In response to commands from the control circuit 410, the NAND Command circuit 412 generates the required command sequences and timing to control the one or more NAND Flash memory devices coupled to the NAND Flash interface 402. ECC hardware is coupled to the split data move control circuit 400 via the ECC hardware interface 404 and allows for ECC generation, storage, and evaluation (after their associated ECC codes are retrieved) of the one or more logical data sectors being moved.

In addition, the control circuit 410 is coupled to and controls the loading of the initial values of the A target row address register 414 and the B target row address register 416 from the microprocessor. The A and B target row address registers are coupled to a row address multiplexer 418 which couples the selected row target address to the NAND Flash interface 402. To facilitate data masking by writing "FF" data into the internal data latch to modify its data contents, so that only the desired data is moved to the A and B target rows, A and B pre-count counters 422, 428 and post-count counters 426, 432 are provided and coupled to the control circuit 410 to allow them to be loaded. An A post-count column address register 424 and a B post-count column address register 430 are also provided and coupled to the control circuit 410, allowing them to be loaded with a supplied column address from the microprocessor. Since the masking from the start of the selected A or B source row always starts with column address 0 of the physical row page, no pre-count column address is necessary. A column address multiplexer 420 is provided to multiplex the selected A post-count column address register 424 or B post-count column address register 430 to the NAND Flash interface 402. It is noted that, as the address/data interface of most general NAND architecture Flash memory devices is a bi-directional bus that is a data word wide (typically 8 or more bits wide), the multiple inputs and outputs of the NAND Flash interface 402 shown in FIG. 4 will be multiplexed into the address/data bus by the split data move control circuit 400 with the appropriate command signals at their required moment in the NAND command sequence. It is noted that a non-split data move control circuit, since only data from a single source row is being moved only a single target row address register (instead of an A target row address register 414 and a B target row address register 416) and single set of pre-count counter, post address register, and post-count counter (instead of A and B pre-count counters 422, 428, post address registers 430, 432, and post-count counters 426, 432) would be utilized. This would also allow for the elimination of the row address multiplexer 418 and column address multiplexer 420 in the non-split data move control circuit.

In operation, when data is decided to be moved (typically due to data consolidation, block erasure, or similar reasons) external address generation hardware (not shown) in combination with the microprocessor and automation control generate the physical row and column addresses of the source physical rows to be moved and load them into the NAND command circuit 412 via a provided source address interface 434. A target physical row pair in a pair of target erase blocks that the data will be moved to are selected by the external address generation hardware and microprocessor/automation control. In this source and target selection process the microprocessor/automation control may try to preferentially defragment data and map logical data sectors that have become fragmented and stored in multiple physical addresses into a contiguous range of physical addresses in the target erase blocks. Once a range or a fragment of a range of logical address which maps to one or more data sectors stored in a physical range of addresses across one or more physical row pages is selected as a source by the automation control and microprocessor, the source pair row and column addresses and the row addresses of the starting pair of target physical row pages (from target erase block A and erase block B) into the split data move control circuit 400 of FIG. 4 are loaded. In addition, masking information to select the desired ranges of column addresses from both the source A physical row and source B physical row are loaded (A and B Pre-Count Counters 422, 428, Post Address Registers 424, 430, and Post-Count Counters 426, 432). In a non-split data move control circuit, since only one or more sectors from a single source erase block are being moved, only a single source erase block and source row and a single target erase block and target row is generated and loaded along with a single set of masking information to select the desired range of column addresses from the source row (Pre-Count Counter, Post Address Register, and Post-Count Counter).

The control circuit 410 of the split data move control circuit 400 of FIG. 4 then directs the NAND command circuit to move the selected data from the first physical row page (source A physical row page). Data is read from the selected source A physical row page in the NAND device's memory array to its internal data latches. The selected data from the physical row page is read out of the data latches to the ECC hardware to generate and store ECC codes for the selected data sectors. The latched data is then masked by writing 1's ("FF" data) into the latch for each data word starting from column zero of the row page for the number of data words (bytes) loaded into the A Pre-Count Counter 422. This masks out unselected data from zero or more pre-data data words of an initial portion of the latched A source row page. Zero or more unselected post-data data words are then masked out of the final portion of the physical page utilizing the starting address of the post-data data words held in the A source Post Address Register 424 and the count held in the A source Post-Count Counter 426. The unmasked/selected data remaining in the NAND memory's data latches is then written into the physical row selected by the address held in the target A row address register 414. The external address generation hardware then toggles the A/B Select line 436 to change the split data move control circuit 400 to source B/target B from moving source A/target A and the data move process is then repeated utilizing the B Pre-Count Counter 428, B Post Address Register 430, B Post-Count Counter 432, and target B row address register 416 to read, mask, and write the selected data from source B physical row to the target B physical row via the NAND architecture memory's internal data latches. In a non-split data move control circuit, because the sector data 302 and ECC data 304 are stored on the same physical row in the memory array, only a single source row is read, transferred out of the memory, masked, and written to move the selected sector and associated ECC data held on the row.

In this process, in a split data memory embodiment, as the ECC codes associated with the selected data sectors 302 of the previous source physical row page are read, they are coupled to the ECC hardware which evaluates them against the stored ECC codes it generated and stored in the source A move operation. New ECC codes are then also generated and stored for selected data sectors of the current source physical row page (the source B physical row page). This ECC process is repeated for each subsequent row of ECC codes and sector data. In a non-split data memory embodiment, as the ECC codes 304 associated with the selected data sectors 302 are read at the same time from the same source physical row, the ECC hardware can generate and compare the ECC codes with the stored codes in a single step.

Due to the formatting structure of the split data physical row page 350, 352 and the non-split data physical row page 310, the ECC/overhead data and the sector data are typically contiguous. In the split data physical row page 350, 352, with the ECC data 304 coming before the sector data 302, the final ECC codes of the current physical row page (associated with the sectors of the previous physical row page) abut the initial data sectors of the current physical row page. In the non-split data physical row page 310, the associated ECC data 304 trailing the selected sector data 302. As a result of this, only a contiguous range of column addresses need be moved from any split or non-split data source physical row page. In addition, while masking can occur in data move operations that span multiple contiguous source physical rows, the data move operation may also simply move any contiguous intermediate physical row pages as whole rows and not mask any data, although masking may also occur, loading the A and B Pre-Count Counters 422, 428, Post Address Registers 424, 430, and Post-Count Counters 426, 432 with zeros. In this, the external address generation hardware in split data embodiments operates the A/B select lines 436 to toggle selection of the current A/B target and source physical page rows, the row increment signal line 438 to increment to the next sequential row addresses, and Zero Row signal lines 440 to wrap around in the A/B source and target erase blocks during movement of data from more that two physical row pages. Because they may only select a portion of a physical page row, the final two physical row pages of a split data multiple contiguous source physical row data move operation (and the single final row of a non-split data multiple contiguous source physical row data move operation) utilize a data mask, as the two initial physical row pages can, to select only the data (sector 302 and ECC codes 304) that is to be moved. As the number of data sectors moved decrease, the initial two physical row page move operations and final row data move operations will merge until, when the data sectors to be moved reside on only the initial source A physical row page, only a single pair of data split physical row pages are accessed (in this case the move operation only needs to move the data sectors from source A physical row page and the associated ECC codes from source B physical row page). It is noted that the moves of intermediate source physical row pages, since they move an entire physical row page, can also be accomplished with a conventional copy-back command operation.

Waveforms of a portion of a data move operation of the split data move control circuit 400 of FIG. 4 are detailed in FIGS. 5A and 5B. It is noted that the waveforms of a non-split data move control circuit based off the split data move control circuit 400 of FIG. 4 for embodiments of the present invention only mask and move a single source row at a time and therefore will have the similar waveform portions to those shown in FIGS. 5A and 5B. The read phase 500 of the modified copy-back sequence of a split data move is detailed in FIG. 5A, and the masking and write phase 502 are detailed in FIG. 5B. In FIG. 5A, source data of a selected physical row page is read into the internal data latches of a NAND architecture Flash memory device. The read operation is initiated by the chip enable (CE#) going active low 504 and selecting the NAND architecture Flash memory device for access. A read command of "00" 508 is placed on the data bus-by the split data move control circuit 400 utilizing a data clock 510 placed on the write enable (WE#) line and is latched into the NAND architecture Flash memory by an active pulse 506 on the command latch enable (CLE) signal line. The address latch enable goes active 512 and the source column and row addresses 514 are then placed on the bus and clocked into the NAND architecture Flash memory device using the WE# data clock 510. The read command is completed by the placing of a "30" command 516 on the data bus and latched into the NAND architecture Flash memory device execution logic via a pulse on the CLE signal line 520 to start execution of the read operation. As the read operation is executed by the NAND architecture Flash memory device it pulls the ready/busy (R/B#) line low 524.

After the read operation is executed the split data move control circuit 400 requests status by placing a "70" status request 518 on the data bus and latching it into the NAND architecture Flash memory device execution logic via a pulse on the CLE signal line 522. The data clock on the WE# line is then stopped and the read enable (RE#) is asserted active low 530 to reverse the direction of the data bus. The NAND architecture Flash memory device then asserts a "busy" (status code "80") 526 on the data bus until the selected physical row page has been retrieved from the memory array and is present in the internal data latches, at which point the asserted status code on the data bus changes to "ready" (status code "E0") 528. In addition, at this time the NAND architecture Flash memory device releases the R/B# line 544 and allows it to go inactive. It will be appreciated by those skilled in the art that the R/B# line in some embodiments may be utilized to exclusively track the status of the NAND architecture Flash memory device. However, as NAND architecture Flash memory systems can comprise one or more memory devices and the R/B# line is common amongst the devices and can be overdriven by another memory device in the system, it may not always be an indicator of the status of the device being operated on. As a result, in these situations directly requesting status of the memory device being operated on via the data bus is a more direct measure of device status.

Once the ready status has been read from the data bus and NAND architecture Flash memory device has indicated that the selected physical row page has been retrieved from the memory array and is present in the internal data latches, the RE# line goes inactive 532 and the data bus is reversed. A "00" command 534 is then placed on the data bus by the split data move control circuit 400 and clocked in and latched into the NAND architecture Flash memory device's execution logic by pulses on the WE# 536 and CLE 538 signal lines to begin reading the retrieved data. The retrieved data 540 is then read from the NAND architecture Flash memory device to be sent to the ECC hardware by a read data clock signal 542 placed on the RE# signal line.

After the read phase of the data operation and the data of the source physical row page has been placed into the internal data latches, the program and masking phase begins. In FIG. 5B, the program phase begins by the split data move control circuit 400 placing a modified data program command 550 (code "85") on the data bus and clocked in and latched into the NAND architecture Flash memory device's execution logic by a data clock 554 on the WE# signal line and a pulse 552 on the CLE signal line. The ALE signal line is then brought active 556 and the target address 558 (target physical row page, hence a column address of 00 00) is then clocked into the NAND architecture Flash memory device. Once the target address has been loaded and the ALE signal is placed inactive, "FF" data 560 is clocked into the NAND architecture Flash memory device by the split data move control circuit 400 until the value placed in the selected Pre-Count counter 422, 428 is decremented to zero. This places FF data into the internal data latch up to the beginning of the selected data of the source physical row page, masking it off so it will not be written to the target physical row page. A random input command 562 (code "85" again for this stage of the program execution) is issued on the data bus and is latched in with a pulse 564 on the CLE signal line. The ALE signal line is asserted again 588 and the column address 568 for the random input, which is held in the selected Post Address Register 424, 430 for the selected source physical row page is placed on the data bus and clocked into the NAND architecture Flash memory device. The ALE signal line is then placed inactive and "FF" data is placed on the data bus 570 by the split data move control circuit 400 until the value placed in the selected Post-Count counter 426, 432 is decremented to zero, masking out the data in the data latch after the selected data.

Once the undesired data is masked out, the modified data program operation is completed and executed by placing a "10" code 572 on the data bus and latching it into the NAND architecture Flash memory device's execution logic by a pulse CLE 574 signal line. This writes the modified data held in the internal data latch into the selected target physical row page. After the modified data is commanded to be written to the Flash memory device the R/B# signal line goes low indicating that the device is busy. The split data move control circuit 400 again requests status by placing a "70" status request 576 on the data bus and latching it into the NAND architecture Flash memory device execution logic via a pulse on the CLE signal line 578. The data clock on the WE# line is then stopped and the read enable (RE#) is asserted active low 590 to reverse the direction of the data bus. The NAND architecture Flash memory device then asserts a "busy" (status code "80") 582 on the data bus until the selected physical row page has been written to the memory array, at which point the asserted status code on the data bus changes to "ready" (status code "E0") 586. In addition, at this time the NAND architecture Flash memory device releases the R/B# line 584 and allows it to go inactive high completing the modified copy-back operation for the selected physical page of the split data NAND Flash memory.

It is noted that the data move control circuit 400 can be adapted to operate with Flash memory devices having differing addressing schemes, erase block sizes, physical sector sizes/formats, and burst or non-burst access modes and should be apparent to those skilled in the art with the benefit of the present disclosure.

It is also noted that other data write/read access sequences and circuits for moving data in split and non-split data memory embodiments of the present invention are possible and should be apparent to those skilled in the art with benefit of the present disclosure.

CONCLUSION

An improved non-volatile memory device, control circuit, or data handling methods have been described that facilitate the moving and consolidating data in split and non-split user/overhead data sector architectures, moving and storing user and overhead data from and to separate non-volatile memory devices, differing erase blocks, or differing sectors of an erase block. This enables ECC checking and masking while moving data. In addition, the use of a split data storage approach is enabled that avoids the issue of potential corruption of both the user data and overhead data due to each being held within close proximity to each other or on the same physical row (wordline), allowing the data to be easily moved, consolidated, and managed. In one non-volatile memory embodiment of the present invention, the memory utilizes specialized data move hardware and/or routines to read, transfer data from the memory, mask off, and store the user data and associated overhead data from a source erase block to the one or more sectors of a target erase block. In another non-volatile memory embodiment of the present invention, the memory utilizes specialized data move hardware and/or routines to read, mask off, and store the user data in a sector of an erase block and the associated overhead data in a sector of a different erase block. This data move circuitry and method facilitates the use of split data separation of the user data and its associated overhead data, allowing for an increased possibility of data recovery in case of a corruption of the user data and/or overhead data stored in either erase block. In one embodiment of the present invention, ECC overhead data of a moved sector is evaluated as the underlying split or non-split user data and overhead data areas are moved. This allows data errors in the user data or overhead data/ECC to be noted and/or fixed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A non-volatile memory system comprising:
at least one non-volatile memory device, wherein the at least one non-volatile memory device contains a memory array with a plurality of physical row pages arranged in a plurality of erase blocks, wherein each physical row page containing one or more user data sectors and one or more overhead data areas; and
wherein a non-split data move control circuit is adapted to move one or more selected user data sectors and associated overhead data areas stored in one or more physical row pages of a selected source erase block to a target erase block in a modified copy-back move operation such that selected user data sectors and the associated overhead data areas stored in a source physical row page of the source erase block are moved to a target physical row page of the target erase block by reading the selected user data sectors and the associated overhead data areas into an internal latch of the at least one non-volatile memory device, transferring one or more latched user data sectors and associated overhead data areas from the at least one non-volatile memory device, masking the selected user data sectors and the associated overhead data areas, and writing the selected user data sectors and the associated overhead data areas to the target physical row page.

2. The non-volatile memory system of claim 1, wherein an interface to the non-volatile memory system is compatible with a mass storage device.

3. The non-volatile memory system of claim 1, wherein an interface to the non-volatile memory system is one of a PCMCIA-ATA, a Compact Flash (CF), a USB Flash, and a multimedia card (MMC) compatible interface.

4. The non-volatile memory system of claim 1, wherein one or more non-volatile memory devices of the non-volatile memory system are one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

5. The non-volatile memory system of claim 1, wherein each user data sector contains 512 bytes.

6. The non-volatile memory system of claim 1, wherein each associated overhead data area contains an error correction code (ECC).

7. The non-volatile memory system of claim 6, wherein the non-split data move control circuit is adapted to evaluate the associated ECC codes as data is moved.

8. A non-volatile memory system comprising:
at least one non-volatile memory device, wherein the at least one non-volatile memory device contains a memory array with a plurality of physical row pages arranged in a plurality of erase blocks, wherein the erase blocks of the at least one non-volatile memory device are arranged in pairs into a plurality of super blocks and each physical row page containing one or more user data sectors and one or more overhead data areas; and
wherein a split data move control circuit is adapted to move one or more selected user data sectors stored in two or more physical row pages of a selected source super block to a target super block such that the selected user data sectors stored in a first source physical row page of the source super block are moved to a first target physical row page of the target super block and the associated overhead data areas of the selected user data sectors stored in a second source physical row page of the source super block are moved to a second target physical row page of the target super block.

9. The non-volatile memory system of claim 8, wherein the split data move control circuit is adapted to move data between the source and target super blocks, where the source and target super blocks are in the same non-volatile memory device.

10. The non-volatile memory system of claim 8, wherein the split data move control circuit is adapted to move data between the source and target super blocks, where the source and target super blocks are in differing non-volatile memory devices.

11. The non-volatile memory system of claim 8, wherein an interface to the non-volatile memory system is compatible with a mass storage device.

12. The non-volatile memory system of claim 8, wherein an interface to the non-volatile memory system is one of a PCMCIA-ATA, a Compact Flash (CF), a USB Flash, and a multimedia card (MMC) compatible interface.

13. The non-volatile memory system of claim 8, wherein one or more non-volatile memory devices of the non-volatile memory system are one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

14. The non-volatile memory system of claim 8, wherein each associated overhead data area contains an error correction code (ECC).

15. The non-volatile memory system of claim 14, wherein the split data move control circuit is adapted to evaluate the associated ECC codes as data is moved.

16. A Flash memory system comprising:
at least one Flash memory device, wherein the at least one Flash memory device contains a memory array with a plurality of floating gate memory cells arranged in a plurality of erase blocks, and wherein each erase block of the plurality of erase blocks contains a plurality of physical row pages, each physical row page containing one or more user data sectors and one or more overhead data areas;
wherein the erase blocks of the at least one Flash memory device are arranged in pairs into a plurality of super blocks;
a control circuit adapted to control data accesses to the sectors of the erase block pair of a selected super block such that user data access and overhead data accesses are directed to differing erase blocks of the super block; and
wherein a split data move control circuit is adapted to move one or more selected user data sectors stored in two or more physical row pages of an erase block pair of a selected source super block such that the selected user data sectors stored in a first source physical row page of a first erase block of the source super block are moved to a first target physical row page of a first erase block of a target super block and the associated overhead data areas of the selected user data sectors stored in a second source physical row page of a second erase block of the source super block are moved to a second target physical row page of a second erase block of the target super block.

17. The Flash memory system of claim 16, wherein the split data move control circuit is adapted to move data between the source and target super blocks, where the source and target super blocks are in the same non-volatile memory device.

18. The Flash memory system of claim 16, wherein the split data move control circuit is adapted to move data between the source and target super blocks, where the source and target super blocks are in differing non-volatile memory devices.

19. The Flash memory system of claim 16, wherein the split data move control circuit is adapted to evaluate an error correction code (ECC) stored in each associated overhead data area as data is moved.

20. The Flash memory system of claim 16, wherein the split data move control circuit is adapted to read data with a NAND Flash read command.

21. The Flash memory system of claim 16, wherein the split data move control circuit is adapted to read data with a NAND Flash modified data write command.

22. The Flash memory system of claim 16, wherein the split data move control circuit is adapted to mask a selected range of data column bit values in an internal data latch by masking a pre-count range of undesired column bit values and masking a post-count range of undesired data column bit values.

23. The Flash memory system of claim 22, wherein the split data move control circuit is adapted to mask by masking the pre-count range starting from a column address zero in the source physical page and masking a post-count range starting from a selected post column address in the source physical page.

24. The Flash memory system of claim 22, wherein the split data move control circuit is adapted to mask a selected range of data column bit values in the internal data latch by inserting logical 1's into the internal data latch to replace unwanted data.

25. A non-volatile memory device comprising:
a memory array containing a plurality of memory cells arranged into a plurality of sectors in a plurality of erase blocks, wherein the erase blocks are arranged in pairs into a plurality of super blocks, and wherein each erase block of the plurality of erase blocks contains a plurality of physical row pages, each physical row page containing one or more user data sectors and one or more overhead data areas;
a control circuit, wherein the control circuit is adapted to perform data accesses to the sectors of the erase block pair of a super block such that user data access and overhead data accesses are directed to differing erase blocks of the super block; and
a split data move control circuit, wherein the split data move control circuit is adapted to move one or more selected user data sectors and associated overhead data areas stored in two or more physical row pages of an erase block pair of a selected source super block such that the selected user data sectors stored in a first source physical row page of a first erase block of the source super block are moved to a first target physical row page of a first erase block of a target super block and the associated overhead data areas of the selected user data sectors stored in a second source physical row page of a second erase block of the source super block are moved to a second target physical row page of a second erase block of the target super block.

26. The non-volatile memory device of claim 25, wherein the non-volatile memory device is one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

27. The non-volatile memory device of claim 25, wherein the split data move control circuit is adapted to evaluate an error correction code (ECC) stored in each associated overhead data area as data is moved.

28. The non-volatile memory device of claim 27, further comprising:
a pair of internal data latches, wherein the split data move control circuit is adapted to store the one or more selected user data sectors of the first source physical row in a first internal data latch and the one or more associated overhead data areas of the second source physical row to allow for the error correction code (ECC) for each user data sector and associated overhead data area to be evaluated and the data corrected as necessary before written to the target super block.

29. A non-volatile memory controller comprising:
a control circuit coupled to a host interface;
a memory device interface for one or more non-volatile memory devices coupled to the memory control circuit, wherein each of the one or more non-volatile memory devices has a memory array containing a plurality of memory cells arranged into a plurality of sectors in a plurality of erase blocks, and wherein each erase block of the plurality of erase blocks contains a plurality of physical row pages, each physical row page containing one or more user data sectors and one or more overhead data areas;
wherein the control circuit is adapted to perform data accesses to the sectors of the plurality of erase blocks of the one or more non-volatile memory devices; and
a non-split data move control circuit, wherein the non-split data move control circuit is adapted to move one or more selected user data sectors and associated overhead data areas stored in one or more physical row pages of a selected source erase block of the one or more non-volatile memory devices such that the selected user data sectors and the associated overhead data areas stored in a source physical row page of the source erase block are moved to a target physical row page of a target erase block by reading the selected user data sectors and the associated overhead data areas into an internal latch of the one or more non-volatile memory devices, transferring one or more latched user data sectors and associated overhead data areas from the at least one non-volatile memory device, masking the selected user data sectors and the associated overhead data areas, and writing the selected user data sectors and the associated overhead data areas to the target physical row page.

30. The non-volatile memory controller of claim 29, wherein the non-volatile memory controller is adapted to control one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

31. The non-volatile memory controller of claim 29, wherein the non-volatile memory controller is adapted to present an interface that is compatible with a mass storage device.

32. The non-volatile memory controller of claim 29, wherein each associated overhead data area contains an error correction code (ECC).

33. The non-volatile memory controller of claim 32, wherein the non-split data move control circuit is adapted to evaluate the one or more selected user data sectors and their associated ECC codes as data is moved.

34. The non-volatile memory controller of claim 33, wherein the non-split data move control circuit is adapted to respond to detecting an unfixable error by one of alerting a data failure in the memory system, marking an affected sector as corrupt, and doing nothing.

35. The non-volatile memory controller of claim 33, wherein the split data move control circuit is adapted to respond to detecting a fixable error by one of fixing the error in the internal latch before writing to the target physical row page, fixing the error and writing to a new target physical row page, and doing nothing.

36. A non-volatile memory controller comprising:
a control circuit coupled to a host interface;
a memory device interface for one or more non-volatile memory devices coupled to the memory control circuit, wherein each of the one or more non-volatile memory devices has a memory array containing a plurality of memory cells arranged into a plurality of sectors in a plurality of erase blocks, wherein the erase blocks are arranged in pairs into a plurality of super blocks, and wherein each erase block of the plurality of erase blocks contains a plurality of physical row pages, each physical row page containing one or more user data sectors and one or more overhead data areas;
wherein the control circuit is adapted to perform data accesses to the sectors of the erase block pair of a super block of the one or more non-volatile memory devices such that user data access and overhead data accesses are directed to differing erase blocks of the super block; and
a split data move control circuit, wherein the split data move control circuit is adapted to move one or more selected user data sectors and associated overhead data areas stored in two or more physical row pages of an erase block pair of a selected source super block of the one or more non-volatile memory devices such that the selected user data sectors stored in a first source physical row page of a first erase block of the source super block are moved to a first target physical row page of a first erase block of a target super block and the associated overhead data areas of the selected user data sectors stored in a second source physical row page of a second erase block of the source super block are moved to a second target physical row page of a second erase block of the target super block.

37. The non-volatile memory controller of claim 36, wherein the control circuit is adapted to sequentially access physical sectors of the first and second erase blocks in a pattern that alternates between physical row pages of a first and a second erase block of each super block as the physical sectors of the super block are sequentially accessed.

38. The non-volatile memory controller of claim 36, wherein the non-volatile memory controller is adapted to control one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

39. The non-volatile memory controller of claim 36, wherein the non-volatile memory controller is adapted to present an interface that is compatible with a mass storage device.

40. The non-volatile memory controller of claim 36, wherein each associated overhead data area contains an error correction code (ECC).

41. The non-volatile memory controller of claim 40, wherein the split data move control circuit is adapted to evaluate the one or more selected user data sectors and their associated ECC codes as data is moved.

42. The non-volatile memory controller of claim 41, wherein the split data move control circuit is adapted to respond to detecting an unfixable error by one of alerting a data failure in the memory system, marking an affected sector as corrupt, and doing nothing.

43. The non-volatile memory controller of claim 41, wherein the split data move control circuit is adapted to respond to detecting a fixable error by one of fixing the error and writing to a new target physical row page, and doing nothing.

44. A non-split data move control circuit comprising:
a control circuit, wherein the control circuit is adapted to receive a non-split user and overhead data move request, command one or more user data sectors and associated overhead data areas of a source physical row page of a source erase block to be read into an internal latch of a non-volatile memory device, command transferring one or more latched user data sectors and associated overhead data areas from the non-volatile memory device, command the masking of the one or more user data sectors and associated overhead data areas in the internal latch, and command writing the one or more user data sectors and associated overhead data areas to a target physical row page of a target erase block.

45. A split data move control circuit comprising:
a control circuit, wherein the control circuit is adapted to receive a split user and overhead data move request and read one or more user data sectors of a source physical row page of a first erase block of a source erase block pair and write the one or more user data sectors to a target physical row page of a first erase block of a target erase block pair, and read one or more associated overhead data codes from a source physical row page of a second erase block of the source erase block pair and write the one or more associated overhead data codes to a target physical row page of a second erase block of the target erase block pair.

46. A NAND architecture Flash memory non-split data move control circuit comprising:
a control circuit coupled to a NAND command circuit, a target row register, a source Pre-Count Counter, a source Post Address Register, and a source Post-Count Counter;
wherein a microprocessor interface, an automation control interface, an external address generation hardware interface, and a NAND Flash interface are coupled to the non-split data move control circuit; and
wherein the non-split data move control circuit is adapted to read one or more user data sectors and/or ECC codes of a source physical row page of a source erase block of a NAND architecture Flash memory device and write the one or more user data sectors and/or ECC codes to a target physical row page of a target erase block addressed by the target row register, where the non-split data move control circuit is adapted to transfer the one or more user data sectors and/or ECC codes from the NAND architecture Flash memory device, and where the non-split data move control circuit is adapted to mask a selected range of read data as it is held in a data latch.

47. The NAND architecture Flash memory non-split data move control circuit of claim 46, wherein the non-split data move control circuit is adapted to read data with a NAND Flash read command.

48. The NAND architecture Flash memory non-split data move control circuit of claim 46, wherein the non-split data move control circuit is adapted to write data with a NAND Flash modified data write command.

49. The NAND architecture Flash memory non-split data move control circuit of claim 46, wherein the non-split data move control circuit is adapted to mask out a pre-count range of undesired column bit values stored in the Pre-Count Counter and a post-count range of undesired data column bit values stored in the Post-Count Counter.

50. The NAND architecture Flash memory non-split data move control circuit of claim 49, wherein the split data move control circuit is adapted to mask out the pre-count range starting from column address zero in the source physical page and is adapted to mask out the post-count range starting from a selected post column address stored in the Post Address Register.

51. The NAND architecture Flash memory non-split data move control circuit of claim 46, wherein the selected range of data column bit values in the data latch are masked out the selected range of data by inserting data comprising logical 1's into the data latch to replace unwanted data.

52. The NAND architecture Flash memory non-split data move control circuit of claim 46, wherein the non-split data move control circuit is adapted to utilize a NAND Flash status command to check for NAND Flash memory device command completion.

53. The NAND architecture Flash memory non-split data move control circuit of claim 46, wherein the non-split data move control circuit is adapted to utilize a Ready/Busy (R/B#) signal line to check for NAND Flash memory device command completion.

54. A NAND architecture Flash memory split data move control circuit comprising:
a control circuit coupled to a NAND command circuit, an A and B target row registers, a source A and B Pre-Count Counters, a source A and B Post Address Register, and a source A and B Post-Count Counters;
wherein a microprocessor interface, an automation control interface, an external address generation hardware interface, and a NAND Flash interface are coupled to the split data move control circuit; and
wherein the split data move control circuit is adapted to read one or more user data sectors and/or ECC codes of a source A physical row page of a first erase block of a source erase block pair and write the one or more user data sectors and/or ECC codes to a target A physical row page of a first erase block of a target erase block pair addressed by the target A row register, and read one or more user data sectors and/or ECC codes from a source B physical row page of a second erase block of the source erase block pair and write the one or more user data sectors and/or ECC codes to a target B physical row page of a second erase block of the target erase block pair addressed by the target B row register.

55. The NAND architecture Flash memory split data move control circuit of claim 54, wherein the split data move control circuit is adapted to read data with a NAND Flash read command.

56. The NAND architecture Flash memory split data move control circuit of claim 54, wherein the split data move control circuit is adapted to write data with a NAND Flash modified data write command.

57. The NAND architecture Flash memory split data move control circuit of claim 54, wherein the split data move control circuit is adapted to mask a selected range of read data as it is held in a data latch.

58. The NAND architecture Flash memory split data move control circuit of claim 57, wherein the split data move control circuit is adapted to mask out a pre-count range of undesired column bit values stored in the A or B Pre-Count Counter and a post-count range of undesired data column bit values stored in the A or B Post-Count Counter.

59. The NAND architecture Flash memory split data move control circuit of claim 58, wherein the split data move control circuit is adapted to mask out the pre-count range starting from column address zero in the source physical page and is adapted to mask out the post-count range starting from a selected post column address stored in the A or B Post Address Register.

60. The NAND architecture Flash memory split data move control circuit of claim 57, wherein the selected range of data column bit values in the data latch are masked out the selected range of data by inserting data comprising logical 1's into the data latch to replace unwanted data.

61. The NAND architecture Flash memory split data move control circuit of claim 54, wherein the split data move control circuit is adapted to utilize a NAND Flash status command to check for NAND Flash memory device command completion.

62. The NAND architecture Flash memory split data move control circuit of claim 54, wherein the split data move control circuit is adapted to utilize a Ready/Busy (R/B#) signal line to check for NAND Flash memory device command completion.

63. A method of operating a non-volatile memory system comprising:
reading data of a physical page row of a source erase block from a selected non-volatile memory device of one or more non-volatile memory devices to internal data latches of the selected non-volatile memory device;
transferring selected data from the selected non-volatile memory device;
masking a first selected range of data column bit values in the internal data latches; and
writing the first selected range of data column bit values from the internal data latches to a physical page row of a target erase block.

64. The method of claim 63, wherein reading data of a physical page row of a source erase block from a selected non-volatile memory device of one or more non-volatile memory devices to internal data latches of the selected non-volatile memory device further comprises reading data of a physical page row of a source erase block from a selected non-volatile memory device of one or more non-volatile memory devices where the selected non-volatile memory device comprises one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

65. The method of claim 63, wherein masking a selected range of data column bit values in the data latches further comprises masking off a pre-count range of undesired column bit values and a post-count range of undesired data column bit values.

66. The method of claim 65, wherein masking off a pre-count range and a post-count range further comprises masking off a pre-count range starting from column address zero in the source physical page and masking off a post-count range starting from a selected post column address in the source physical page.

67. The method of claim 63, wherein masking a selected range of data column bit values in the data latches further comprises masking out a selected range of data by inserting logical 1's.

68. The method of claim 63, further comprising:
presenting an interface to the non-volatile memory system compatible with a mass storage device.

69. A method of operating a split data non-volatile memory system comprising:
reading data of a physical page row of a first source erase block of a source super block from a selected non-volatile memory device of one or more non-volatile memory devices;
masking off a first selected range of data column bit values;
writing the first selected range of data column bit values to a physical page row of a first target erase block of a target super block;
reading data of a physical page row of a second source erase block of the source super block;
masking off a second selected range of data column bit values; and
writing the second selected range of data column bit values to a physical page row of a second target erase block of the target super block.

70. The method of claim 69, wherein reading data of a physical page row of a first source erase block of a source super block from a selected non-volatile memory device of one or more non-volatile memory devices further comprises reading data of a physical page row of a first source erase block of a source super block from a selected non-volatile memory device of one or more non-volatile memory devices where the selected non-volatile memory device comprises one of a NOR architecture Flash memory device, a NAND architecture Flash memory device, a Polymer memory device, a Ferroelectric Random Access Memory (FeRAM) memory device, a Ovionics Unified Memory (OUM) memory device, and a Magnetoresistive Random Access Memory (MRAM) memory device.

71. The method of claim 69, wherein masking off a selected range of data column bit values further comprises masking off a pre-count range of undesired column bit values and a post-count range of undesired data column bit values.

72. The method of claim 71, wherein masking off a pre-count range and a post-count range further comprises masking off a pre-count range starting from column address zero in the source physical page and masking off a post-count range starting from a selected post column address in the source physical page.

73. The method of claim 69, wherein masking a selected range of data column bit values further comprises masking out a selected range of data by inserting logical 1's.

74. The method of claim 69, further comprising:
presenting an interface to the data splitting non-volatile memory system compatible with a mass storage device.

75. A method of operating a split data non-volatile memory system comprising:
reading one or more user data sectors of a physical page row of a first source erase block of a source super block from a selected non-volatile memory device of one or more non-volatile memory devices;
writing the one or more user data sectors to a physical page row of a first target erase block of a target super block;
reading one or more overhead data areas of a physical page row of a second source erase block of the source super block; and
writing the one or more overhead data areas to a physical page row of a second target erase block of a target super block.

76. The method of claim 75, wherein writing the one or more user data sectors their associated overhead data areas to the target super block further comprises writing the one or more user data sectors and their associated overhead data areas to the target super block, where the source and target super blocks are in the same non-volatile memory device.

77. The method of claim 75, wherein writing the one or more user data sectors their associated overhead data areas to the target super block further comprises writing the one or more user data sectors and their associated overhead data areas to the target super block, where the source and target super blocks are in differing non-volatile memory devices.

78. The method of claim 75, wherein reading one or more overhead data areas of a physical page row of a second source erase block of the source super block further comprises reading one or more overhead data areas of a physical page row of a second source erase block of the source super block, where each associated overhead data area contains an error correction code (ECC).

79. The method of claim 78, further comprising:
evaluating the one or more user data sectors their associated ECC codes for data errors as data is moved.

80. The method of claim 79, wherein evaluating the one or more user data sectors and their associated ECC codes for data errors as data is moved further comprises evaluating the one or more user data sectors and their associated ECC codes for data errors as data is moved, where the response to detecting an unfixable error is one of alerting a data failure in the memory system, marking an affected sector as corrupt, and doing nothing.

81. The method of claim 79, wherein evaluating the one or more user data sectors and their associated ECC codes for data errors as data is moved further comprises evaluating the one or more user data sectors and their associated ECC codes for data errors as data is moved, where the response to detecting a fixable error is one of fixing the error and writing to a new target physical row page, and doing nothing.

82. The method of claim 79, further comprising:
storing the one or more user data sectors before writing them to a physical page row of a first target erase block of a target super block until their associated ECC codes can be read and evaluated against the stored one or more user data sectors and any possible data corrections made.

83. A method of moving data in a memory system comprising:
reading one or more user data sectors and one or more overhead data areas of a physical page row of a source erase block from a selected non-volatile memory device of one or more non-volatile memory devices;
transferring selected data of the one or more user data sectors and one or more overhead data areas from the selected non-volatile memory device;
masking the one or more user data sectors and one or more overhead data areas; and
writing the one or more user data sectors and one or more overhead data areas to a physical page row of a target erase block.

84. A method of moving split data in a memory system comprising:
reading one or more user data sectors of a physical page row of a first source erase block of a source super block from a selected non-volatile memory device of one or more non-volatile memory devices;

writing the one or more user data sectors to a physical page row of a first target erase block of a target super block;

reading one or more overhead data areas of a physical page row of a second source erase block of the source super block; and writing the one or more overhead data areas to a physical page row of a second target erase block of a target super block.

85. A system comprising:

a host coupled to a Flash memory system, wherein the Flash memory system comprises:

at least one Flash memory device, wherein the at least one Flash memory device contains a memory array with a plurality of floating gate memory cells arranged in a plurality of erase blocks, and wherein each erase block of the plurality of erase blocks contains a plurality of physical row pages, each physical row page containing one or more user data sectors and one or more overhead data areas;

a control circuit adapted to control data accesses to the sectors of a selected erase block; and wherein a non-split data move control circuit is adapted to move one or more selected user data sectors and associated overhead data areas stored in one or more physical row pages of the selected source erase block to a target erase block in a modified copy-back move operation such that selected user data sectors and the associated overhead data areas stored in a source physical row page of the source erase block are moved to a target physical row page of the target erase block by reading the selected user data sectors and the associated overhead data areas into an internal latch of the at least one Flash memory device, transferring one or more latched user data sectors and associated overhead data areas from the at least one Flash memory device, masking the selected user data sectors and the associated overhead data areas, and writing the selected user data sectors and the associated overhead data areas to the target physical row page.

86. The system of claim 85, wherein the Flash memory system is adapted to appear to the host as a rewriteable storage device.

87. The system of claim 85, wherein the host is one of a processor and an external memory controller.

88. The system of claim 85, wherein an interface to the Flash memory system is compatible with a mass storage device.

89. A system comprising:

a host coupled to a Flash memory system, wherein the Flash memory system comprises:

at least one Flash memory device, wherein the at least one Flash memory device contains a memory array with a plurality of floating gate memory cells arranged in a plurality of erase blocks, and wherein each erase block of the plurality of erase blocks contains a plurality of physical row pages, each physical row page containing one or more user data sectors and one or more overhead data areas;

wherein the erase blocks of the at least one Flash memory device are arranged in pairs into a plurality of super blocks;

a control circuit adapted to control data accesses to the sectors of the erase block pair of a selected super block such that user data access and overhead data accesses are directed to differing erase blocks of the super block; and wherein a split data move control circuit is adapted to move one or more selected user data sectors stored in two or more physical row pages of an erase block pair of a selected source super block such that the selected user data sectors stored in a first source physical row page of a first erase block of the source super block are moved to a first target physical row page of a first erase block of a target super block and the associated overhead data areas of the selected user data sectors stored in a second source physical row page of a second erase block of the source super block are moved to a second target physical row page of a second erase block of the target super block.

90. The system of claim 89, wherein the Flash memory system is adapted to appear to the host as a rewriteable storage device.

91. The system of claim 89, wherein the host is one of a processor and an external memory controller.

92. The system of claim 89, wherein an interface to the Flash memory system is compatible with a mass storage device.

93. A method of moving data in a split data NAND architecture Flash memory system comprising:

reading data of a physical page row of a first source erase block of a source super block from a selected NAND architecture Flash device of one or more non-volatile memory devices into an internal data latch;

writing the data by:

masking off a first selected range of data column bit values in the internal data latch, and writing the first selected range of data column bit values in the internal data latch to a physical page row of a first target erase block of a target super block of the selected NAND architecture Flash memory device;

reading data of a physical page row of a second source erase block of the source super block into the internal data latch; and writing the data by:

masking off a second selected range of data column bit values in the internal data latch, and writing the second selected range of data column bit values from the internal data latch to a physical page row of a second target erase block of the target super block.

94. The method of claim 93, wherein reading data further comprises reading data with a NAND Flash read command.

95. The method of claim 93, wherein writing data further comprises writing data with a NAND Flash modified data write command.

96. The method of claim 93, wherein masking a selected range of data column bit values in the internal data latch further comprises masking out a pre-count range of undesired column bit values and a post-count range of undesired data column bit values.

97. The method of claim 96, wherein masking out a pre-count range and a post-count range further comprises masking out a pre-count range starting from column address zero in the source physical page and masking out a post-count range starting from a selected post column address in the source physical page.

98. The method of claim 93, wherein masking a selected range of data column bit values in the internal data latch further comprises masking out a selected range of data by inserting 1's into the internal data latch to replace unwanted data.

99. The method of claim 93, wherein reading and writing the data further comprise reading and writing the data utilizing a NAND Flash status command to check for read and/or write command completion.

100. The method of claim 93, wherein reading and writing the data further comprise reading and writing the data utilizing a Ready/Busy (R/B#) signal line to check for read and/or write command completion.

101. A non-volatile memory system comprising:
- at least one non-volatile memory device, wherein the at least one non-volatile memory device contains a memory array with a plurality of physical row pages arranged in a plurality of erase blocks, wherein each physical row page contains one or more user data sectors and one or more overhead data areas; and
- wherein a data move control circuit has a means for moving one or more selected user data sectors and one or more associated overhead areas stored in one or more physical row pages of a selected source erase block to a target erase block such that the selected user data sectors and associated overhead areas are masked and transferred from the at least one non-volatile memory device as they are moved.

102. A non-volatile memory system comprising:
- at least one non-volatile memory device, wherein the at least one non-volatile memory device contains a memory array with a plurality of physical row pages arranged in a plurality of erase blocks, wherein the erase blocks of the at least one non-volatile memory device are arranged in pairs into a plurality of super blocks and each physical row page containing one or more user data sectors and one or more overhead data areas; and
- wherein a split data move control circuit has a means for moving one or more selected user data sectors stored in two or more physical row pages of a selected source super block to a target super block such that the selected user data sectors stored in a first source physical row page of the source super block are moved to a first target physical row page of the target super block and the associated overhead data areas of the selected user data sectors stored in a second source physical row page of the source super block are moved to a second target physical row page of the target super block.

* * * * *

UNITED STATES PATENT AND TRADEMARK OFFICE
CERTIFICATE OF CORRECTION

PATENT NO. : 7,350,044 B2  Page 1 of 1
APPLICATION NO. : 10/769016
DATED : March 25, 2008
INVENTOR(S) : Keays It is certified that error appears in the above-identified patent and that said Letters Patent is hereby corrected as shown below:

In column 21, line 23, in Claim 4, delete "Ovionics" and insert -- Ovonics --, therefor.

In column 22, line 10, in Claim 13, delete "Ovionics" and insert -- Ovonics --, therefor.

In column 23, line 53-54, in Claim 26, delete "Ovionics" and insert -- Ovonics --, therefor.

In column 24, line 45, in Claim 30, delete "Ovionics" and insert -- Ovonics --, therefor.

In column 25, line 49, in Claim 38, delete "Ovionics" and insert -- Ovonics --, therefor.

In column 28, line 50, in Claim 64, delete "Ovionics" and insert -- Ovonics --, therefor.

In column 29, line 33, in Claim 70, delete "Ovionics" and insert -- Ovonics --, therefor.

In column 33, line 25, in Claim 101, before "to" insert -- to internal data latches and then --.

Signed and Sealed this

Tenth Day of June, 2008

JON W. DUDAS
*Director of the United States Patent and Trademark Office*